US010114210B2

(12) United States Patent
Tian et al.

(10) Patent No.: US 10,114,210 B2
(45) Date of Patent: Oct. 30, 2018

(54) FLUORESCENT WHEEL, DOUBLE-COLOR LASER SOURCE AND LASER PROJECTION EQUIPMENT

(71) Applicants: HISENSE CO., LTD., Qingdao (CN); HISENSE USA CORPORATION, Suwanee, GA (US); HISENSE INTERNATIONAL CO., LTD., Qingdao (CN)

(72) Inventors: Youliang Tian, Qingdao (CN); Qiang Wang, Qingdao (CN); Xianrong Liu, Qingdao (CN); Wei Li, Qingdao (CN)

(73) Assignees: HISENSE CO., LTD., Shandong (CN); HISENSE USA CORPORATION, Suwanee, GA (US); HISENSE INTERNATIONAL CO., LTD., Shandong (CN)

( * ) Notice: Subject to any disclaimer, the term of this patent is extended or adjusted under 35 U.S.C. 154(b) by 0 days.

(21) Appl. No.: 15/294,595

(22) Filed: Oct. 14, 2016

(65) Prior Publication Data

US 2017/0111620 A1    Apr. 20, 2017

(30) Foreign Application Priority Data

Oct. 14, 2015   (CN) .......................... 2015 1 0657074
Oct. 14, 2015   (CN) .......................... 2015 1 0658098

(51) Int. Cl.
*G03B 21/20*    (2006.01)
*G02B 26/00*    (2006.01)
(Continued)

(52) U.S. Cl.
CPC ......... *G02B 26/008* (2013.01); *G02B 5/0278* (2013.01); *G02B 5/0294* (2013.01);
(Continued)

(58) Field of Classification Search
CPC .... G02B 26/008; G02B 27/141; G02B 27/48; G02B 5/0278; G02B 5/0294; G02B 1/11;
(Continued)

(56) References Cited

U.S. PATENT DOCUMENTS

| 8,157,398 B2* | 4/2012 | Yamamoto | G03B 21/204 353/38 |
| 2013/0088471 A1* | 4/2013 | Kitano | H04N 9/3114 345/208 |

(Continued)

*Primary Examiner* — Sultan Chowdhury
*Assistant Examiner* — Magda Cruz
(74) *Attorney, Agent, or Firm* — J.C. Patents

(57) ABSTRACT

The disclosure provides a fluorescent wheel, including a fluorescent region and a transmission region; the fluorescent region has fluorescence powder for emitting fluorescence under excitation by excitation laser; and the transmission region is for transmitting laser; the fluorescent wheel is for diffusing at least laser to be transmitted. Using fluorescent wheel to diffuse laser enables laser transmission meanwhile removing speckles by diffusion, sparing a separate speckle-removing component, improving light processing efficiency of fluorescent wheel. The disclosure also provides a double-color laser source using the fluorescent wheel, and a laser projection equipment including the double-color laser source, which can output three-primary-color light via fluorescent wheel component, meanwhile removing speckles for double-color laser, thereby reducing usage of optical components, and lowering complexity of optical architecture of double-color laser source, contributing to miniaturization of laser projection equipment. The disclosure is applied in the field of laser illumination display technologies.

22 Claims, 22 Drawing Sheets

(51) Int. Cl.
  *H04N 9/31*   (2006.01)
  *G02B 5/02*   (2006.01)
  *G02B 27/14*  (2006.01)
  *G02B 27/48*  (2006.01)
  *G03B 21/00*  (2006.01)
  *G03B 33/08*  (2006.01)
  *G02B 1/11*   (2015.01)

(52) U.S. Cl.
  CPC ........... *G02B 27/141* (2013.01); *G02B 27/48* (2013.01); *G03B 21/00* (2013.01); *G03B 21/204* (2013.01); *G03B 33/08* (2013.01); *H04N 9/3111* (2013.01); *H04N 9/3158* (2013.01); *H04N 9/3161* (2013.01); *H04N 9/3164* (2013.01); *G02B 1/11* (2013.01); *G02B 5/0268* (2013.01)

(58) Field of Classification Search
  CPC .... G02B 5/0268; G03B 21/00; G03B 21/204; G03B 33/08; H04N 9/3111; H04N 9/3158; H04N 9/3161; H04N 9/3164
  See application file for complete search history.

(56) References Cited

U.S. PATENT DOCUMENTS

| | | | |
|---|---|---|---|
| 2014/0118991 A1* | 5/2014 | Lin | G02B 26/008 362/84 |
| 2016/0109789 A1* | 4/2016 | Zhao | G03B 33/08 362/84 |

\* cited by examiner

FLUORESCENT WHEEL, DOUBLE-COLOR LASER SOURCE AND LASER PROJECTION EQUIPMENT

CROSS REFERENCE TO RELATIVE APPLICATIONS

This application claims the priority of Chinese patent application No. 201510658098.4, entitled "FLUORESCENT WHEEL AND DOUBLE-COLOR LASER SOURCE", and filed to the Patent Office of the People's Republic of China on Oct. 14, 2015, as well as the priority of Chinese patent application No. 201510657074.7, entitled "FLUORESCENT WHEEL AND DOUBLE-COLOR LASER SOURCE", and filed to the Patent Office of the People's Republic of China on Oct. 14, 2015, both of which are hereby incorporated by reference in their entireties.

TECHNICAL FIELD

The disclosure relates to the field of laser illumination display, and in particular to a fluorescent wheel, a double-color laser source and a laser projection equipment.

BACKGROUND

Laser, as a light source with high brightness and strong directivity, can emit monochromatic coherent beams. And its various merits have given rise to an ever increasing utilization of laser as a light source in the field of projection display technologies in recent years. A pure laser source, however, is confronted with a grave speckle issue and high cost, which accounts for the currently broad application of mixed laser sources of fluorescence and laser.

Fluorescence is generated by exciting fluorescence powder with laser after coating the fluorescence powder on a wavelength conversion device. For instance, three-primary-color light results from excitation of green and red fluorescence powder by blue laser, in which green fluorescence powder and red fluorescence powder are coated on a rotating wavelength conversion device, which is typically a fluorescent wheel structure, and sequentially outputs three primary-color light in accordance with time sequence through rotation. As another option, a red-blue double-color laser source is employed to generate the three primary-color light, where blue laser excites green fluorescence powder on a fluorescent wheel to generate green fluorescence, which, along with blue laser and red laser, forms the three primary-color light.

At present, the fluorescent wheel may be divided into transmission-type ones and reflection-type ones.

For a transmission-type fluorescent wheel, a substrate where fluorescence powder is coated is made of transparent material, allowing fluorescence resulted from excitation by excitation laser to diverge in an omnidirection covering 360 degrees, in which part of beams diverging towards the laser incident side can be reflected back off a reflective film coated on the laser incident side of the substrate, and transmit through the transparent substrate of the fluorescent wheel, before emitting outwards in the same direction in which the excitation laser is incident. As shown in a diagrammatic cross-section of the outer circumference of a fluorescent wheel in FIG. 1, 3b is a fluorescence powder layer, usually formed through mixing binder with fluorescence powder and secured between two layers of glass 3a on the front and the rear sides, in which the inner surface, where the front-side (i.e., the laser incident side) glass comes into contact with the fluorescence powder layer, is coated with a film 3c for transmitting laser and reflecting fluorescence, and the rear-side (i.e., the opposite side of the laser incident side) glass is used for transmitting the reflected fluorescence and fluorescence which is directly incident onto the glass surface.

In a reflection-type fluorescent wheel, as shown in FIG. 2, fluorescence powder is normally arranged on the outer circumference of an aluminum substrate, so that after fluorescence is generated from excitation by laser, part of the fluorescence is reflected by a mirror surface of the aluminum substrate at the opposite side of the laser incident side, while part of the fluorescence is allowed to directly emit out after reflection in a direction opposite to the laser incident direction, and the transmitted laser, in a direction opposite to that of the fluorescence, requires to travel through a circuit design for optical axis conversion, so as to be eventually optically combined with the fluorescence.

Both of the fluorescent wheels of the above two types are provided with a laser transmission region, which sequentially outputs laser and fluorescence in accordance with the rotation sequence of the fluorescent wheel, and the outputted laser via transmission can only serve as a light source after passing through a speckle-removing optical path for speckle removal.

In addition, the overall brightness of a laser source has been heightened since red laser devices took the place of red fluorescence, as red-blue double-color laser finds application, whereas the enrichment in the variety of laser devices further deteriorates the speckle phenomenon, calling for a special speckle-removing component to be added in the optical design, for instance, an optical fiber, a random phase plate and auxiliary components are introduced to design a speckle-removing optical path, guaranteeing the quality of a light source for projection and illumination, while leading to an increase in the volume and complexity of an optical architecture, which in turn goes against miniaturization of laser projection equipments.

SUMMARY

The disclosure is realized through the following technical solutions:

A fluorescent wheel, includes a fluorescent region and a transmission region; the fluorescent region has fluorescence powder for emitting fluorescence under excitation by excitation laser; the transmission region is for transmitting laser;

where the fluorescent wheel is for diffusing at least laser to be transmitted.

In addition, a double-color laser source, includes a blue laser device and a red laser device, for respectively emitting blue laser and red laser, where the double-color laser source also includes a fluorescent wheel as described by the above solution, the fluorescent wheel transmits and diffuses first laser and second laser, where the first laser is red laser, the second laser is blue laser, the fluorescent region of the fluorescent wheel includes green fluorescence powder, the excitation laser is blue laser, for exciting the green fluorescence powder to emit green fluorescence, the red laser, the blue laser and the green fluorescence are sequentially outputted by the fluorescent wheel in sequence to form three-primary-color light.

In addition, a laser projection equipment, includes a display component, an optical module, a control component and a double-color laser source as described by the above solution, where the optical module includes a first optical component for guiding light from the double-color laser source towards the display component, and a second optical component for projecting light emitted by the display component onto a screen, the control component is configured to control the display component and the double-color laser source.

DESCRIPTION OF EMBODIMENTS

In order to make the objectives, technical solutions and advantages of the disclosure clearer, the disclosure will be further detailed as following in conjunction with accompanying drawings. Obviously, the described embodiments epitomize mere part rather than all of the embodiments of the disclosure. All the other embodiments achieved by those skilled in the art on the basis of the embodiments of the disclosure without creative effort shall fall into the protection scope of the disclosure.

The disclosure provides a fluorescent wheel, which includes a fluorescent region and a transmission region; the fluorescent region has fluorescence powder for emitting fluorescence under excitation by excitation laser; the transmission region is for transmitting laser; where the fluorescent wheel is for diffusing at least laser to be transmitted.

Figure 3:
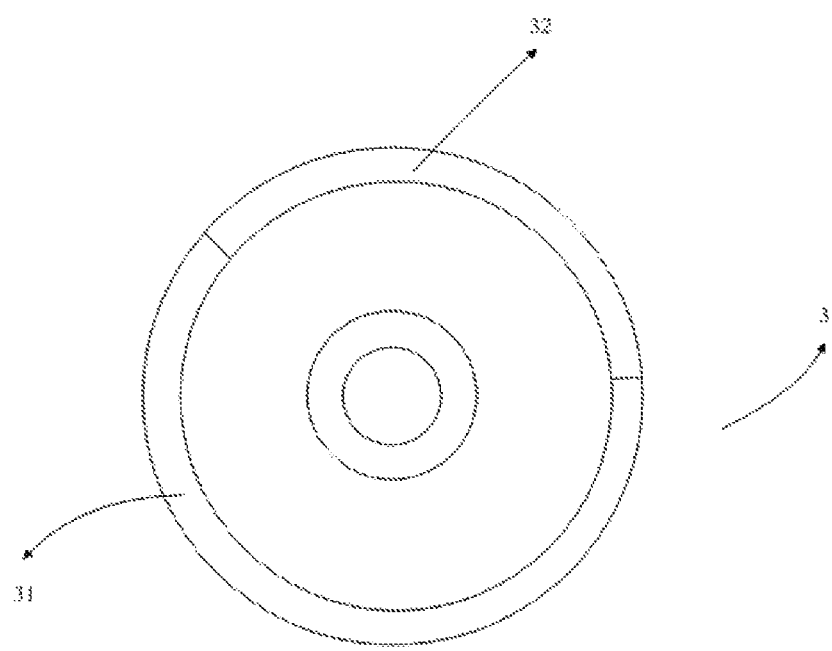
FIG. 3 is a planar distribution diagram of a fluorescent wheel provided by an embodiment of the disclosure.
Figure 4:
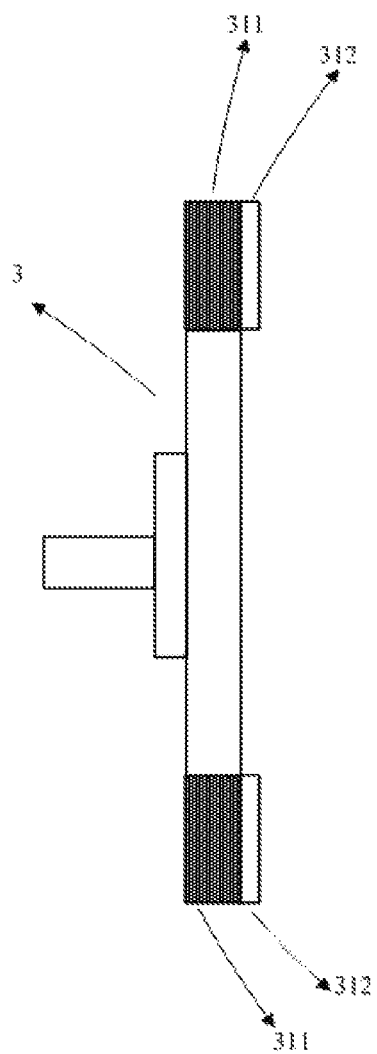
FIG. 4 is a cross-sectional structure diagram of a fluorescent wheel provided by an embodiment of the disclosure.
Figure 5:
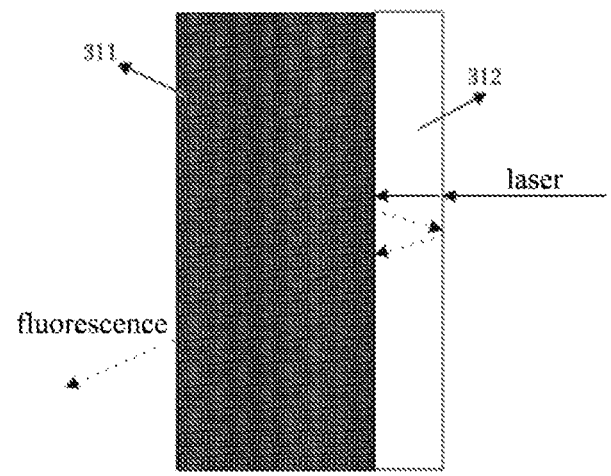
FIG. 5 is a local enlarged diagram of FIG. 4.

Specifically, as shown in FIG. 3, in accordance with an embodiment of the disclosure, a fluorescent wheel 3 is disc-shaped and driven to rotate by a motor. The fluorescent wheel 3 includes a fluorescent region 31 and a non-fluorescent region, where the non-fluorescent region includes a central motor rotating shaft region and a transmission region 32. Since small light spots will be enough for fluorescence to be excited, it is possible for the fluorescence to be distributed in an annular region near the outer rim of the disc of the fluorescent wheel. Typically, the fluorescent region 31 and the transmission region 32 are arranged in the outer circumferential region of the fluorescent wheel. The fluorescent region 31 is provided with fluorescence powder, for emitting fluorescence under excitation by incident excitation laser. FIG. 4 shows the cross-sectional structure diagram of the fluorescent wheel, where the fluorescent region 31 includes a fluorescent layer 311, and a coating film layer 312 positioned on the surface of the fluorescent layer 311 near the laser incident side. The transmission region 32 is free of fluorescence powder, for providing a separate channel for the propagation of laser, which enables light from a laser source to transmit through the same position during non-fluorescence excitation time window of the rotation sequence of the fluorescent wheel, where the transmission region 32 may be used to transmit excitation laser, or to transmit non-excitation laser. In accordance with an embodiment of the disclosure, the transmission region 32 is used to respectively transmit first laser and second laser, where the second laser acts as the excitation laser. The transmission region may be prepared by embedding a piece of glass in a previously formed groove, or by securing a piece of glass via a clamp or the like. The coating film layer 312 is located on the outer surface of the fluorescent layer 311, namely the laser incident side; and specifically, the coating film layer is a dichroic film, for transmitting the excitation laser with a high transmittance and reflecting part of the fluorescence excited by laser and incident towards the coating film layer, for details of which, please refer to the optical path diagram where fluorescence is excited out by laser and reflected, as shown in FIG. 5, which merely illustrates a case in which part of the fluorescence is excited out, reflected and transmitted. In practical applications, the fluorescence is divergent in multiple directions.

The fluorescent wheel is further used to diffuse at least laser to be transmitted. In accordance with embodiments of the disclosure, the fluorescent wheel at least diffuses laser to be transmitted in a number of ways, including but not limited to: arranging a diffusion component as the transmission region; arranging a diffusion layer at a position corresponding to the transmission region on the surface of the fluorescent wheel; arranging a diffusion layer at positions corresponding to both the transmission region and the fluorescent region on the surface of the fluorescent wheel; and arranging a disc-shaped diffusion layer on the surface of the fluorescent wheel, etc.

In accordance with an implementation of the disclosure, the fluorescent wheel at least diffuses laser to be transmitted, and specifically includes: a diffusion component is arranged as a transmission region, and used for transmitting and diffusing laser. Specifically, as shown in FIG. 3, the transmission region 32 of the fluorescent wheel 3 is a diffusion component. It should be noted that, the transmission region 32 being a diffusion component refers to that the transmission region is made of a diffusion component material, meaning a binary diffractive element, such as a piece with a diffusion function, diffractive optical elements (DOEs) and so on. The transmission region 32 may also be frosted glass, to which no restrictions will be made herein. The transmission region of the diffusion component material may be used for transmitting and diffusing laser passing through the diffusion component structure, such as first laser and second laser, where the first laser is non-excitation laser source, and the second laser is excitation laser source.

Figure 7:
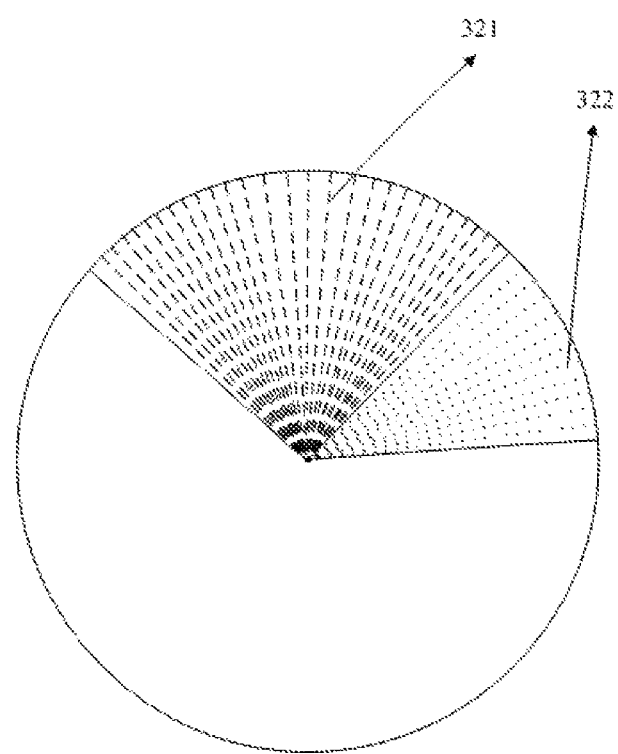
FIG. 7 is a planar distribution diagram of a fluorescent wheel provided by yet another embodiment of the disclosure.

The surface of the diffusion component is coated with a diffuser, processed by sand lasting, or processed to form a micro-structure, for the purpose of raising the diffused reflection degree of the transmitted light beams, increasing the light divergence angle of the light beams, and fulfilling the function of diffusion. Specifically, an arc-shaped notch may be arranged on the outer circumference of the fluorescent wheel, for the diffusion component to be embedded therein. As shown in FIG. 3, a notch is firstly formed at a position corresponding to the transmission region 32 of the fluorescent wheel for the diffusion component structure to be later fastened therein, to be joined together with the fluorescent region 31 to form a full circle. Alternatively, as shown in FIG. 7, the transmission region 32 is a sectorial shaded region (the sum of two different shaded regions), and the fluorescent wheel is provided with a sector-shaped notch, then a diffusion component structure with the same size is embedded in the former, such that the transmission region 32 with a sector region takes shape. The example taken herein is meant to illustrate the shape and mounting position of the diffusion component, to which no restrictions will be made herein.

In the prior art, a transmission region is usually hollowed out or made of a glass material, but the hollowed-out arrangement is likely to make noise due to shearing force generated against airflow during rotation of the fluorescent wheel, other than that, the glass material is only available for transmitting laser. In an embodiment of the disclosure, the transmission region employs a diffusion component material. For one thing, the diffusion component can realize the transmission of blue laser and red laser, allowing laser to emit outwards after passing through the fluorescent wheel; for another thing, the diffusion component, as a part of the fluorescent wheel, conducts periodic rotation motion in accordance with the working characteristics of the fluorescent wheel, and functions as a moving diffusion sheet. And the moving diffusion sheet can generate numerous spatial random phases for highly coherent laser beams, thus undermining the coherence of the laser beams, and alleviating the speckle phenomenon in the formation of a projection image using laser as a light source.

Due to the fact that the sensitivity of human eyes to speckle images generated from laser of different colors varies widely, for example, the human eyes are more sensitive to red laser speckles than to blue laser ones, generally, red laser speckles demand to be removed at a higher level for the two to secure the same display effect.

In accordance with an embodiment of the disclosure, the first laser may be red laser, the second laser may be blue laser, and other than this, blue laser may serve as an excitation laser source to excite green fluorescence powder contained in the fluorescent layer to emit green fluorescence. For the sake of enhancing the diffusion degree of red laser, preferably, in an embodiment of the disclosure, the diffusion component is divided into two diffusion regions, i.e., a first laser diffusion region and a second laser diffusion region. Where, the light divergence angle corresponding to the first laser diffusion region, i.e., a red laser diffusion region, is larger than that corresponding to the second laser diffusion region, i.e., a blue laser diffusion region. A semiconductor photolithography process may be adopted, in which templates and photolithography steps are used to form a microstructure with different granularities, arrangements, and sizes, so as to diffuse laser in different angles.

The diffusion component may diffuse laser by scattering or diffraction, to which no specific restrictions will be made herein.

Figure 6:
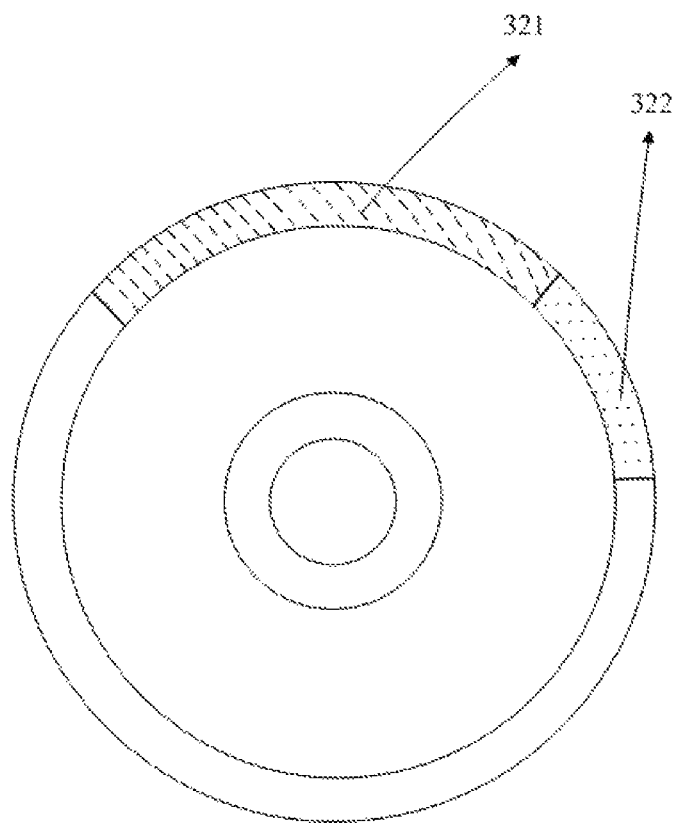
FIG. 6 is a planar distribution diagram of a fluorescent wheel provided by another embodiment of the disclosure.

Specifically, as shown in FIG. 6, the transmission region 32, i.e., the diffusion component, is provided with a blue laser diffusion region 322 and a red laser diffusion region 321, hereafter referred to as the blue light diffusion region and the red light diffusion region, for respectively transmitting and diffusing blue laser and red laser. Specifically, the blue light diffusion region 322 and the red light diffusion region 321 are coated with a diffuser, such as frosted glass or a binary device, for carrying out diffused reflection of laser beams with strong directivity, increasing the divergence angle of the laser beams, and undermining the stability of spatial phase differences between the light beams, so as to spoil the conditions for interference to come into being. Where, the divergence angle of the laser beams by the red light diffusion region is larger than that of the laser beams by the blue light diffusion region, so as to increase the divergence degree of red laser, thereby rendering the same projection effect for red light as for blue light observed by the human eyes.

As an alternative, as shown in FIG. 7, the transmission region, i.e., the diffusion component, includes a red light diffusion region 321 and a blue light diffusion region 322, where the red light diffusion region diverges the transmitted light more widely than the blue light diffusion region.

Figure 9:
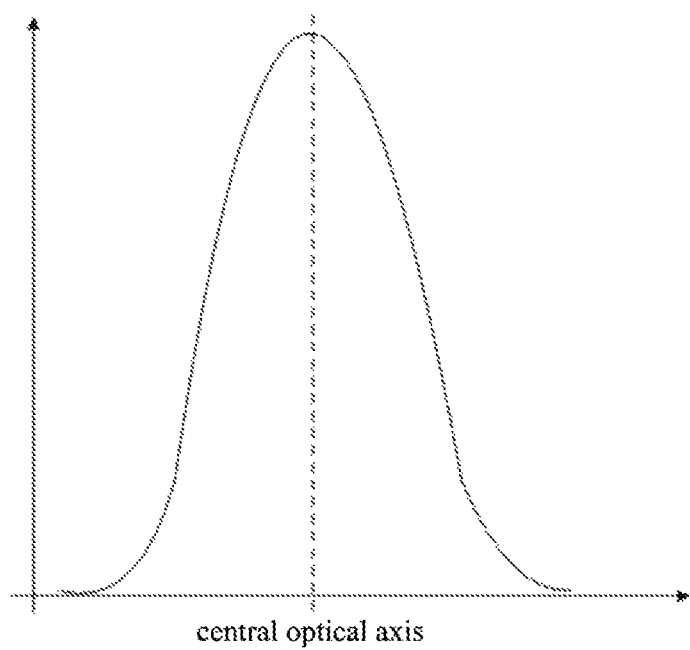
FIG. 9 is a Gaussian distribution diagram of laser beams.

In addition, taking into account that laser energy is distributed in a Gaussian type, as shown in FIG. 9, near the 0-degree optical axis, optical energy is relatively concentrated, the incident angle is the same, the phase or the phase difference is stable, which are likely to generate interference, resulting in a serious speckle phenomenon during formation of a projection image from a light source. As a result, in an effort to improve the speckle-removing effect for red laser, the red light diffusion region 321, may include multiple sub-diffusion regions corresponding to different divergence angles for red laser; specifically, among the multiple sub-diffusion regions, the sub-diffusion region located within a region where the optical axis intersects with the diffusion region diffuses red laser in a larger divergence angle than sub-diffusion regions located in other regions. Such arrangement is able to allow the central region of the laser beam with concentrated energy to be diffused via this type of diffusion regions with a large divergence angle, thus improving the speckle-removing degree for the red laser beams. It should be noted that, the distribution of the sub-diffusion regions and the corresponding light divergence angles may be arranged specifically, in accordance with the energy distribution of laser spots as needed, so as to reduce the spatial coherence, to which no specific restrictions will be made herein.

Figure 8:
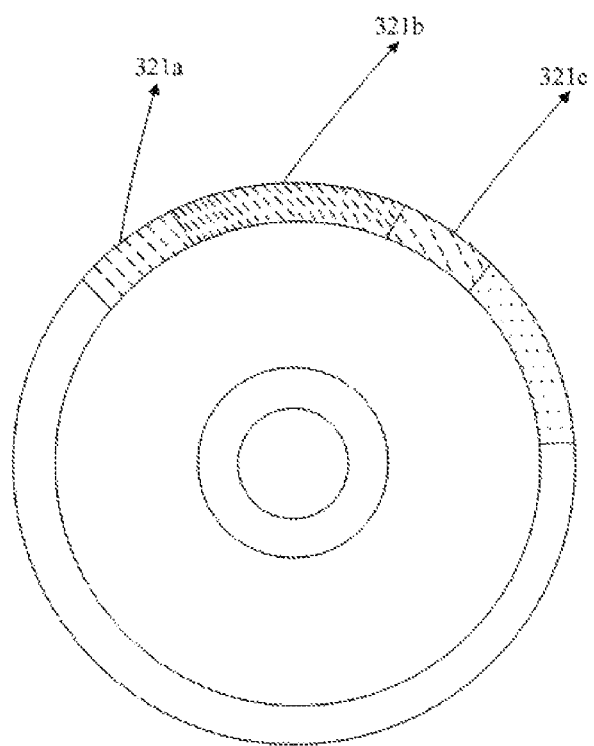
FIG. 8 is a planar distribution diagram of a fluorescent wheel provided by still another embodiment of the disclosure.

As shown in FIG. 8, the red light diffusion region 321 may be divided into three red laser sub-diffusion regions 321a, 321b, 321c. According to an embodiment, in comparison of angles in the term of proportion, the angle covered by the red light sub-diffusion region 321b is larger than or equal to the sum of angles of the red light sub-diffusion regions 321a and 321c, and the red light sub-diffusion regions 321a and 321c have roughly the same angle. For example, out of a central angle of 108 degrees covered by the red light diffusion region, the red light sub-diffusion region 321b accounts for 54 degrees, the red light sub-diffusion regions 321a and 321c respectively cover 27 degrees, and the example is merely taken to qualitatively illustrate three red light sub-diffusion regions corresponding to different diffusion angles, specific values of which are not restricted. Additionally, the red light sub-diffusion region 321b diffuses light in a larger divergence angle than the red light sub-diffusion regions 321a and 321c. For example, the light divergence angle corresponding to the red light sub-diffusion region 321b may be set as 5-5.5 degrees, the light divergence angle corresponding to the red light sub-diffusion region 321a may be set as 2-2.5 degrees, and the light divergence angle corresponding to the red light sub-diffusion region 321c may be set as 2.5-3 degrees; in such a way, the progressive arrangement of the sub-diffusion regions of the red laser diffusion region is able to effectively carry out decoherence targeting the characteristics of Gaussian laser beams, in which most of the light beams near the 0-degree optical axis are diverged for reducing the degree of coherence.

Figure 1:
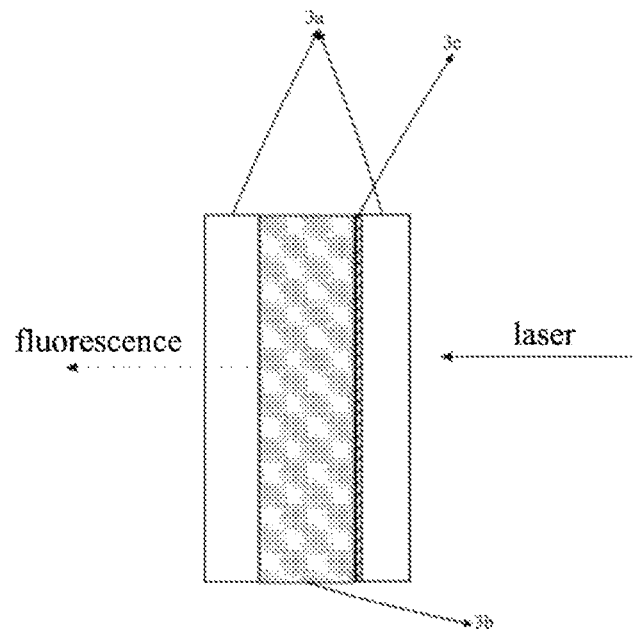
FIG. 1 is an optical path diagram of fluorescence transmitted through a fluorescent wheel.

In addition, in an embodiment of the disclosure, the fluorescent wheel 3 is a transmission-type fluorescent wheel, yet with a structure differing from that of a transmission-type fluorescent wheel in the prior art. As shown in FIG. 1, the transmission-type fluorescent wheel in the prior art is realized by securing a fluorescent layer between two layers of glass plates, and a dichroic film is coated on the inner side of the front-side (i.e., the laser incident side) glass. However, the temperature of the fluorescence powder layer dramatically increases due to accumulation of a large amount of heat generated along with excitation of fluorescence, as a result of poor heat transfer coefficient and low heat dissipation of glass; consequently, the temperature of the whole fluorescent wheel also rises, leading to a decline in fluorescence conversion efficiency. And on the other hand, as the fluorescence powder layer is obtained by mixing adhesive with fluorescence powder, and the adhesive, as an organic material, is capable of absorbing optical energy to a certain extent while enjoying a certain transmittance, therefore, partial optical energy loss is inevitable for either the incident laser or the reflected fluorescence passing through the adhesive (i.e., the above fluorescence powder layer), thus leading to a decrease in excitation efficiency of fluorescence as well as heat generation during the process of absorbing the optical energy in the meantime.

In an embodiment of the disclosure, a substrate of the fluorescent wheel is a transparent substrate made of an inorganic material, such as ceramic, quartz or glass. The fluorescent layer may be formed by curing mixed fluorescence powder and the inorganic material, for instance, a sintering process, rather than bonding via adhesive, is adopted to cure the fluorescence powder in ceramic, quartz or glass. By mixing a selected inorganic material with fluorescence powder to form a substrate shape, heat is less likely to accumulate due to high heat dissipation efficiency of the inorganic material, thereby reducing the impact of heat on the fluorescence conversion efficiency; in addition, the inorganic material hardly absorbs any optical energy, allowing the fluorescence, after reflection over a substrate-thick length, to emit outwards in the same direction as the laser incident direction from the back of the fluorescent wheel without optical loss caused by absorption, thus increasing emergent efficiency of the fluorescence.

Referring to FIG. 4, the fluorescent region 31 includes a fluorescent layer 311 and a coating film layer 312 which is located on the surface of the fluorescent layer 311 near the laser incident side. The fluorescent layer 311 is a mixed layer of a transparent inorganic material substrate and fluorescence powder, and the coating film layer 312 is a dichroic coating film layer. Specifically, blue laser firstly transmits through the dichroic film to be incident onto the fluorescent layer 311, and excites the fluorescence powder in the fluorescent layer 311 to be converted into fluorescence, part of which reflects off the dichroic film 312, and part of which directs passes through the fluorescent layer 311 (the transparent substrate) to emit from the back of the fluorescent wheel.

In summary, fluorescence and laser can be transmitted by the fluorescent wheel provided by technical solutions of the disclosure. By arranging a diffusion component as the transmission region, combined with the working characteristics of the fluorescent wheel during its rotation, the diffusion component of the transmission region makes a moving diffusion sheet, allowing transmission of laser while simultaneously removing speckles by diffusion, sparing an separate speckle-removing component. And light processing efficiency of the fluorescent wheel is boosted, endowing the fluorescent wheel with multi-functions, by means of combining and outputting the first laser, the second laser and fluorescence in the same direction, and speckle removal of the first laser and the second laser via one fluorescent wheel component.

In accordance with another implementation of the disclosure, the fluorescent wheel at least diffuses the laser to be transmitted, and specifically includes: a diffusion layer is further arranged on the surface of the fluorescent wheel, the diffusion layer is arranged corresponding to at least a transmission region, for diffusing laser before the laser arriving at the transmission region. Specifically, the transmission region 32 can be made of a transparent glass material; and the surface of the fluorescent wheel 3 is also provided with a diffusion layer 33, which is at least arranged corresponding to the transmission region 32, for diffusing laser before the laser arriving at the transmission region 32. Specifically, laser emitted by a laser device is firstly incident onto a diffusion layer 33 to be diffused before emitting out, then the diffused laser is incident onto the transmission region 32. In an embodiment of the disclosure, the transmission region 32 is used to respectively transmit first laser and second laser, and the diffusion layer 33 is adopted to diffuse the first laser and the second laser before they arrive at the transmission region 32. Since the transmission region 32 may be an arc section on the outer circumference of the disc of the fluorescent wheel, or a sectorial region within the circular plane, the diffusion layer 33 may correspondingly have a shape matching that of the transmission region 32.

Figure 10A:
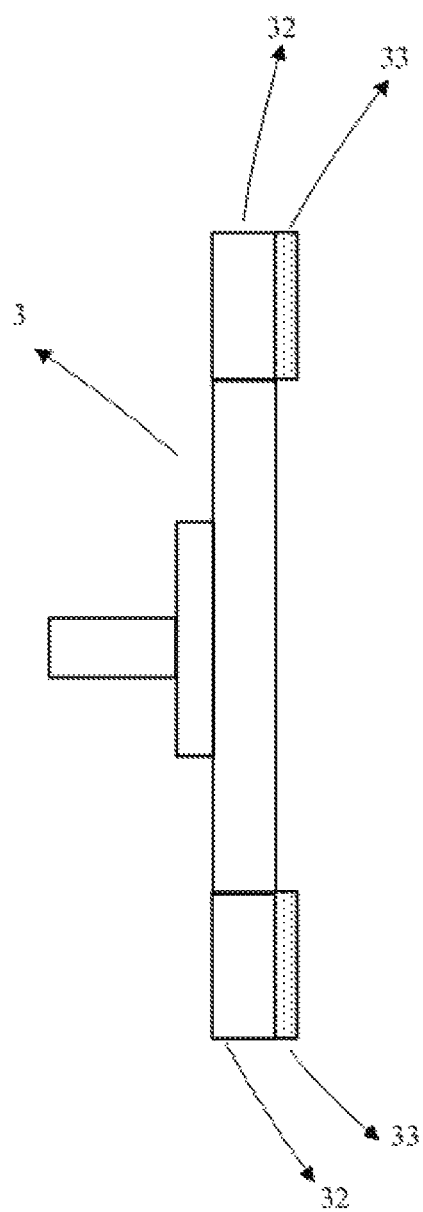
FIG. 10A is a cross-sectional structure diagram of a fluorescent wheel with a diffusion layer provided by an embodiment of the disclosure.
Figure 10B:
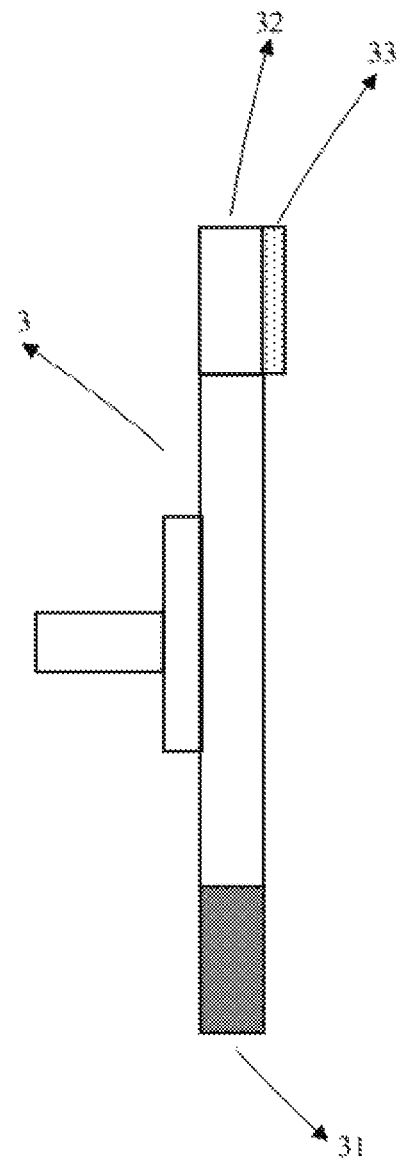
FIG. 10B is a cross-sectional structure diagram of a fluorescent wheel with a diffusion layer provided by another embodiment of the disclosure.

Specifically, in an implementation, the diffusion layer 33 and the transmission region are both of an arc shape, and secured on the surface of the transmission region 32 via bonding by silicone to be fixed together. As shown in FIG. 10A or FIG. 10B, where, two transmission regions in FIG.

10A, distributed symmetrically about the circle center on the whole fluorescent wheel disc, are indicated as two upper and lower parts in a cross-section diagram of FIG. 10A. Correspondingly, the diffusion layer 33 is arranged into two parts matching with the transmission region 32. Apart from the two transmission regions, there is also a fluorescent region at the same circumferential position, which is not shown in the figures. In FIG. 10B, there is one transmission region on the whole disc-shaped substrate, which is indicated as one transmission region 32 in a cross-section diagram of FIG. 10B, corresponding to which, there is one diffusion layer 33; and a fluorescent region 31 is also illustrated. The above FIG. 10A and FIG. 10B are merely meant to illustrate the relationship between positions of the diffusion layer and the transmission region which are correspondingly arranged, as well as the distribution thereof on the fluorescent wheel, to which no restrictions will be made herein.

In another implementation, the diffusion layer 33 is a piece of sector with a same central angle as that corresponding to the arc covered by the transmission region, the diffusion layer 33 is fixed by a rivet and/or dispensing, within the angular region of its sectorial central angle with the central circular region of the fluorescent wheel. In this implementation, in a case where the transmission region 32 is arc-shaped and the diffusion layer 33 is a sector, at least the part of the sector-shaped diffusion layer 33 corresponding to the transmission region 32 fulfills the function of diffusing the incident light.

The diffusion layer 33 may be made of a diffusion component material, which is capable of transmitting and diffusing laser passing through the diffusion component structure. The diffusion component material refers to a binary diffractive element, such as a piece with diffusion function, diffractive optical element (DOE) and the like.

The diffusion layer 33 may also be a layer of frosted glass, such as fused quartz or K9 material.

The diffusion layer 33 may be diffused through scattering or diffraction, and there will be no specific restrictions to the diffusion fashion.

Where, the upper surface of the diffusion layer 33 may be rough, so as to realize diffused reflection of light, and alter divergence angle and direction of the incident angle, while the lower surface may be smooth, so as to be fixed via bonding with the smooth glass surface of the transmission region. The diffusion layer 33 may also be fixed via a structure of clamp, to which no restrictions will be made.

The transmission region 32 of the fluorescent wheel 3 is used to at least transmit laser of one color, and to transmit laser of two colors, i.e., the first laser and the second laser respectively in an embodiment of the disclosure, during rotation of the fluorescent wheel; where the first laser is a non-excitation laser source, and the second laser is an excitation laser source. In accordance with the position of the region where laser is transmitted, the transmission region 32 includes a first laser transmission region and a second laser transmission region, correspondingly, the diffusion layer 33 also includes a first laser diffusion region and a second laser diffusion region. The light divergence angle corresponding to the first laser diffusion region may be the same with or different from that corresponding to the second laser diffusion region. In an embodiment of the disclosure, the first laser diffusion region diffuses light in a larger divergence angle than the second laser diffusion region, which is set for balance between different speckle effects caused by laser of different colors. If the first laser serves as excitation laser, the second laser serves as non-excitation laser, the corresponding diffusion regions are arranged to diffuse light in divergence angles in a reverse manner, namely, the second laser diffusion region diffuses light in a larger divergence angle than the first laser diffusion region.

Figure 11A:
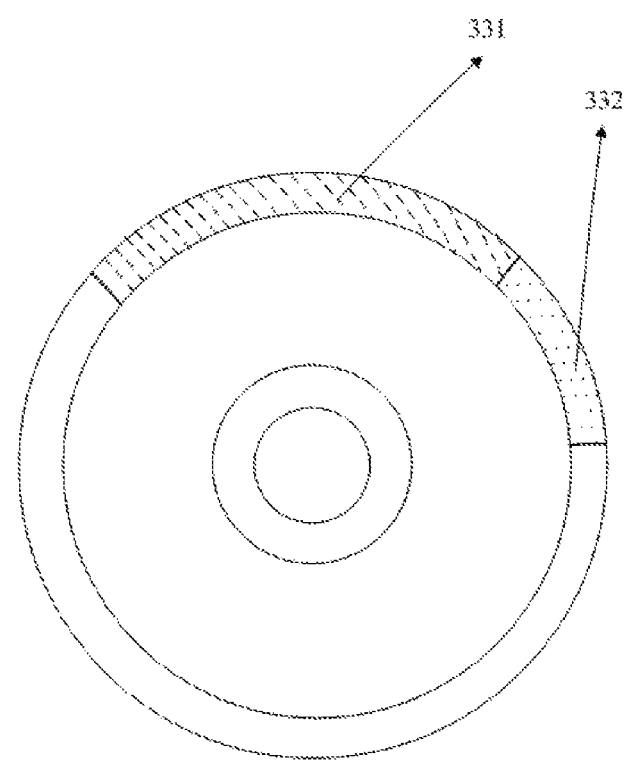
FIG. 11A is a planar distribution diagram of a diffusion layer provided by an embodiment of the disclosure.
Figure 11B:
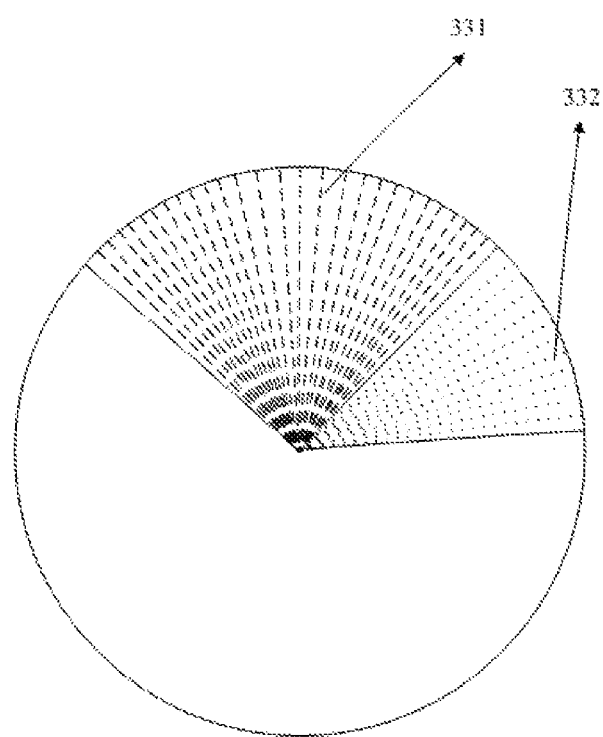
FIG. 11B is a planar distribution diagram of a diffusion layer provided by another embodiment of the disclosure.

The planar distribution of the first laser diffusion region and the second laser diffusion region on the diffusion layer 33 may be schematically illustrated as FIG. 11A The diffusion layer 33 includes a first laser diffusion region 331 and a second laser diffusion region 332, a partition being the same as that of the transmission region 32 on the fluorescent wheel 3, the transmission region 32 also includes a first laser transmission region and a second laser transmission region (not shown in the figures). In FIG. 11A, the diffusion layer 33 is the sum of two shaded arcs; in addition, the diffusion layer 33 may also be the sum of a sector-shaped region 331 and a sector-shaped region 332 as shown in FIG. 11B. When the diffusion layer 33 is sector-shaped, the transmission region 32 may still be a length of arc or one sector region. The example is merely taken to illustrate the shape, partition and the corresponding relationship of the diffusion layer with the transmission region, to which no restrictions will be made herein. The diffusion layer 33 is fixed specifically with the transmission region 32 in a manner as described above, i.e., may be bonded with silicone, or fixed through a rivet and/or dispensing in the angular region.

In an embodiment of the disclosure, by arranging a diffusion layer on the surface of the fluorescent wheel, the diffusion layer is at least arranged corresponding to the transmission region, and as part of the fluorescent wheel, moves alongside rotation of the latter, so as to function as a moving diffusion sheet; the moving diffusion sheet is able to generate a number of spatial random phases for light beams, thus undermining the constant phase difference which is a condition for generation of interference, allowing laser to be diffused before being incident onto the transmission region, thereby removing the speckles.

The corresponding transmission region includes a first laser transmission region and a second laser transmission region, the diffusion layer also includes a first laser diffusion region and a second laser diffusion region, and arrangement of different divergence angles for the two diffusion region is capable of balancing the speckle effects caused by laser of different colors, thus achieving speckle-removing effects roughly the same.

The disclosure also provides a specific implementation of an embodiment of the fluorescent wheel described above and including a diffusion layer, the implementation will be detailed as follows, wherein there will be no description for the same part, and what is different is that the above first laser may specifically be red laser, and the second laser may specifically be blue laser. Blue laser, with a shorter wavelength, typically serves as excitation laser to excite fluorescence powder to generate fluorescence with a longer wavelength.

As the sensitivity of human eyes to a speckle image formed from laser of different colors varies widely, for instance, the human eyes are more sensitive to red laser speckles than to blue laser ones, therefore, the speckle-removing effect of red laser usually needs to be strengthened for the two to achieve roughly the same effect.

For this purpose, in an embodiment of the disclosure, the first laser diffusion region, i.e., the red laser diffusion region diffuses light in a larger divergence angle than the second laser diffusion region, i.e., the blue laser diffusion region.

In applications, despite arranging regions to diffuse light in different divergence angles, the diffusion layer is usually processed as a complete component. In an embodiment of the disclosure, the diffusion layer structure may be prepared via a semiconductor photolithography process; through using templates and photolithography steps, different divergence angles are formed for the same frosted glass or diffusion component materials; and formation of the different divergence angles is associated with granularity, shape, arrangement of the outer surface of the diffusion layer. Two regions corresponding to different divergence angles, for instance, one corresponding to a divergence angle of 1-2 degrees and the other one corresponding to 3-5 degrees, can be formed on one diffusion layer structure, so as to diffuse laser passing through the regions to a corresponding extent.

Likewise, referring to FIG. 11A and FIG. 11B, the diffusion layer 33 is provided with a blue laser diffusion region 332 and a red laser diffusion region 331, hereafter referred to as the blue light diffusion region and the red light diffusion region, for respectively transmitting and diffusing blue laser and red laser. Specifically, outer surfaces be capable of diffusing light in different divergence angles are formed on the blue light diffusion region 332 and the red light diffusion region 331 via the above semiconductor photolithography process, for carrying out diffused reflection of laser beams with strong directivity, increasing the divergence angle of the laser beams, and undermining the stability of spatial phase difference of the light beams, so as to spoil conditions for generation of interference. Where the red light diffusion region diffuses the laser beams in a larger divergence angle than the blue light diffusion region, so as to increase the divergence degree of red laser, rendering roughly the same projection effect for red light and blue light to the human eyes.

In addition, taking into account of the Gaussian type energy distribution of laser, as shown in FIG. 9, near the 0-degree optical axis, optical energy is relatively concentrated, the incident angles are the same, and the phase or the phase difference is stable, which are likely to induce generation of interference and are the main reasons why the laser coherence is so strong, resulting in a severe speckle phenomenon during formation of a projection image from a light source. As a result, in order to improve the speckle-removing effect for red laser, the red light diffusion region 331 may include multiple sub-diffusion regions which diffuse red laser in different divergence angles, where, among the multiple sub-diffusion regions, the sub-diffusion region located within a region where the optical axis intersects with a diffusion region diffuses red laser in a larger divergence angle than sub-diffusion regions located in other regions. Such arrangement is able to allow the central region of the laser beam with concentrated energy to be diffused via this type of diffusion regions corresponding to a large divergence angle, thus improving the speckle-removing degree for the red laser beams. It should be noted that, the distribution and the light divergence angles corresponding to the sub-diffusion regions of the diffusion layer 33 may be arranged specifically, in accordance with the energy distribution of laser spots as needed, so as to reduce the spatial coherence, to which no specific restrictions will be made herein.

Figure 12:
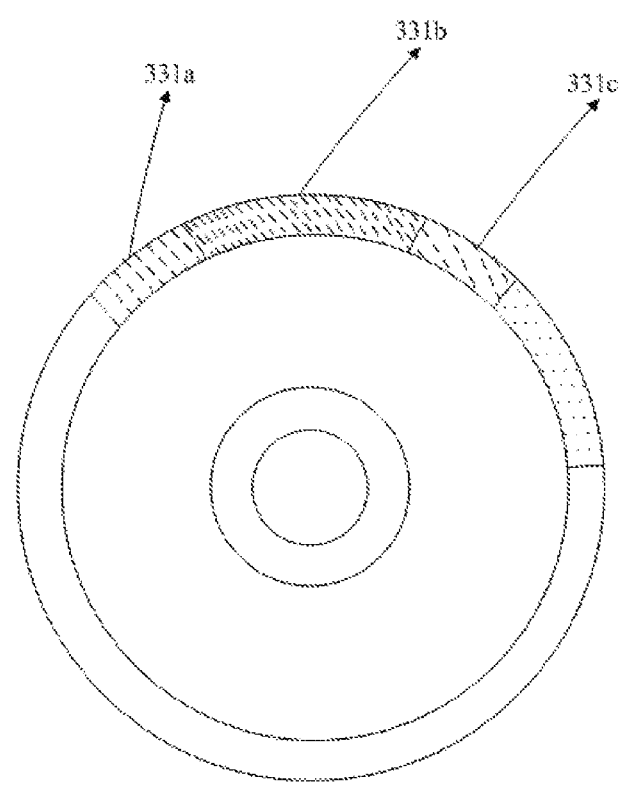
FIG. 12 is a planar distribution diagram of a diffusion layer provided by yet another embodiment of the disclosure.

As shown in FIG. 12, the red light diffusion region may be divided into three red laser sub-diffusion regions 331a, 331b, 331c. According to an embodiment, in comparison of angles in the term of proportion, the angle covered by red light sub-diffusion region 331b is larger than or equal to the sum of angles covered by the red light sub-diffusion regions 331a and 331c, and the red light sub-diffusion regions 331a and 331c have roughly the same angle. For example, out of a central angle of 108 degrees covered by the red light diffusion region, the red light sub-diffusion region 331b accounts for 54 degrees, the red light sub-diffusion regions 331a and 321c respectively cover 27 degrees, and the example is merely taken to qualitatively illustrate three red light sub-diffusion regions corresponding to different diffusion angles, specific values of which are not restricted. Additionally, the red light sub-diffusion region 331b diffuses light in a larger divergence angle than the red light sub-diffusion regions 321a and 321c. For example, the light divergence angle corresponding to the red light sub-diffusion region 331b may be set as 5-5.5 degrees, the light divergence angle corresponding to the red light sub-diffusion region 331a may be set as 2-2.5 degrees, and the light divergence angle corresponding to the red light sub-diffusion region 321c may be set as 2.5-3 degrees; in such a way, the progressive arrangement of the sub-diffusion regions of the red laser diffusion region is able to effectively carry out decoherence targeting the characteristics of Gaussian laser beams, in which most of the light beams near the 0-degree optical axis are diverged, thus increasing light beams with multiple divergence angles, and reducing the degree of coherence of red laser.

In an embodiment of the disclosure, a diffusion layer is arranged on the fluorescent wheel at positions corresponding to the transmission regions of red laser and blue laser, the diffusion layer includes a red laser diffusion region and a blue laser diffusion region, the diffusion layer, as part of the fluorescent wheel, moves along with rotation of the latter, so as to function as a moving diffusion sheet, the moving diffusion sheet is capable of generating a number of spatial random phases for the light beams, thereby undermining the constant phase difference which is a condition for generation of interference, allowing red laser and blue laser to be diffused before being respectively incident onto the transmission region, fulfilling the function of removing speckles.

In accordance with an embodiment of the disclosure, on the basis of the above embodiment, a diffusion layer 33, besides corresponding to the transmission region 32, is arranged corresponding to the fluorescent region 31; where, the angle in which a region of the diffusion layer 33 arranged corresponding to the fluorescent region 31 diffuses light is smaller than of the angle in which a region of the diffusion layer 33 which is arranged corresponding to the transmission region 32 diffuses light. Herein, the region of the diffusion layer corresponding to the fluorescent region has a poor divergence for excitation laser, and mainly plays the role of homogenizing the excitation laser beams.

Figure 13:
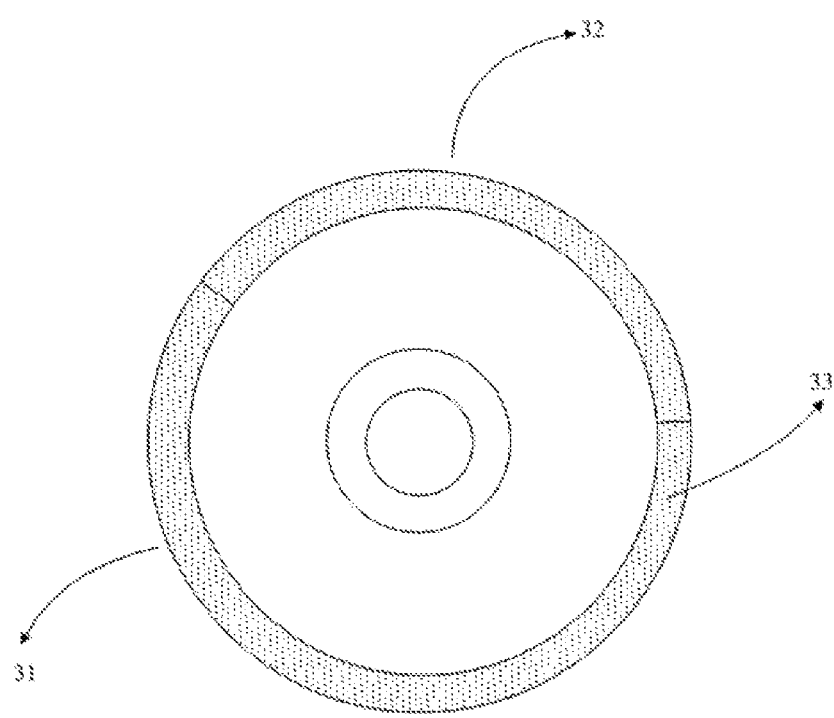
FIG. 13 is a planar distribution diagram of a fluorescent wheel with a diffusion layer provided by an embodiment of the disclosure.
Figure 14:
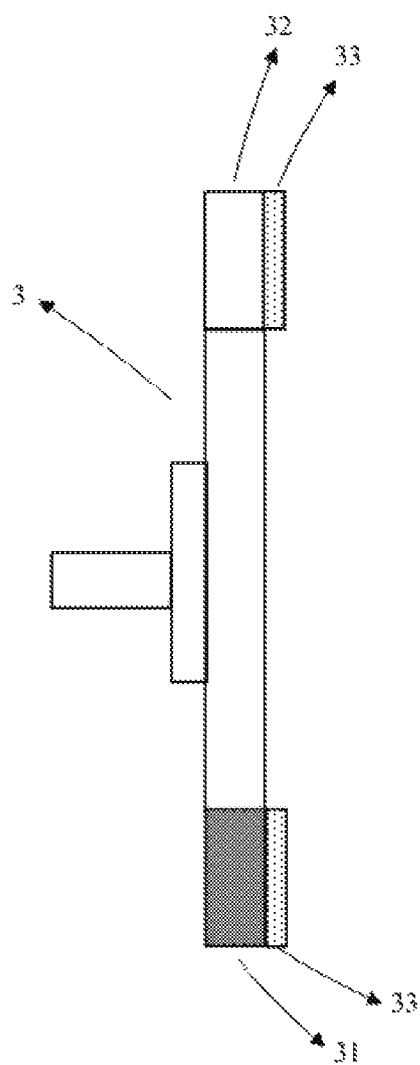
FIG. 14 is a cross-sectional structure diagram corresponding to FIG. 13.

The fluorescent region and the transmission region are typically located on the outer circumference of the fluorescent wheel, and form a closed circle. As illustrated by a planar distribution diagram of a fluorescent wheel in FIG. 13, the shape of the diffusion layer 33 matches that of the region where the fluorescent region and the transmission region are located, and the diffusion layer 33 is also located at the outer circumference of the entire fluorescent wheel as a full circular structure. FIG. 14 is a cross-sectional structural diagram of FIG. 13, and as shown in FIG. 14, the fluorescent region 31, the transmission region 32 located on the same circle as the fluorescent region 31, and the diffusion layer 33 on the outer side of the fluorescent region 31 and the transmission region 32 are sequentially arranged on the disc plane of the fluorescent wheel 3. Herein, the diffusion layer 33 is fixed to the fluorescent region 31 and the transmission region 32 in a way as described in the above embodiment, and will not be repeated. The impact on the chemical stability of the fluorescence powder in the fluorescent region is taken into account to be as little as possible, and in an embodiment of the disclosure, the diffusion layer, rather than being bonded by silicone with the fluorescent region, is preferably riveted and pressed together with a central region of the fluorescent wheel at the central angle region of the sector having the angle corresponding to the arc covered by the transmission region, assisted by fixation via dispensing at a corresponding position.

In an embodiment of the disclosure, the diffusion layer 33 is arranged corresponding to the fluorescent region 31 and located on the outer surface of the fluorescent region 31. In this case, a dichroic coating film layer 312 may be located on the surface of the fluorescent region 31, namely, be realized by coating a film on the surface of the fluorescent region 31; or may be located on the inner surface of the diffusion layer 33, which is in contact with the fluorescent region 311, namely, when the diffusion layer 33 is a diffusion component or a piece of frosted glass, the coating film may be arranged on the inner surface of the diffusion component structure or the frosted glass in contact with the fluorescent region. In order to increase the quantity of light transmitting into the diffusion component, in a specific implementation, an extra layer of antireflection film may be coated on the surface at the laser incident side of the diffusion component, which may increase the quantity of laser transmitting into the diffusion component.

In an embodiment of the disclosure, the fluorescent wheel 3 is a transmission-type fluorescent wheel. In the prior art, the transmission-type fluorescent wheel, as shown in FIG. 1, is obtained by securing a fluorescent region between two layers of glass plates, and a dichroic film is coated on the inner side of the front-side (i.e., the laser incident side) glass. However, the temperature of the fluorescence powder layer dramatically increases due to accumulation of a large amount of heat generated along with excitation of fluorescence, as a result of poor heat transfer coefficient and low heat dissipation of glass; and consequently, the temperature of the whole fluorescent wheel also rises, leading to a decline in fluorescence conversion efficiency. And on the other hand, as the fluorescence powder layer is obtained by mixing adhesive with fluorescence powder, and the adhesive, as an organic material, is likely to produce precipitates at high temperatures when the adhesive has low chemical stability, causing the conversion efficiency of fluorescence to drop; and in the meanwhile, the adhesive is capable of absorbing optical energy to a certain extent while enjoying a certain transmittance, therefore, partial optical energy loss is inevitable for either the incident laser or the reflected fluorescence passing through the adhesive (i.e., the above fluorescence powder layer), thus leading to a decrease in excitation efficiency of fluorescence.

In an embodiment of the disclosure, the fluorescent region 31 may be formed by curing mixed fluorescence powder and an inorganic material, for instance, by curing fluorescence powder into ceramic, quartz or glass via a sintering process, rather than by curing via adhesive bonding. The inorganic material may be ceramic, quartz or glass. After sintering, the fluorescent region which has taken shape forms a layer of transparent fluorescent layer 311 allowing fluorescence generated under excitation to transmit. As shown in FIG. 5, the fluorescent region includes a fluorescent layer 311, i.e., a mixed layer of an inorganic material and fluorescence powder, and also includes a coating film layer 312, which is a dichroic coating film layer located on the outer surface of the fluorescent region, i.e., near the surface of the laser incident side. Specifically, excitation laser, typically being blue laser, firstly transmits through the dichroic film to be incident onto the fluorescent layer 311, and then excites the fluorescence powder in the fluorescent layer 311 to be converted into fluorescence, where part of the fluorescence is reflected off the dichroic film 312 to emit outwards from the back of the fluorescent wheel 3 along with part of the fluorescence which directly passes through the fluorescent layer 311 (a transparent layer), thereby realizing transmission of the fluorescence.

In an embodiment of the disclosure, a diffusion layer is also arranged at a corresponding position of a fluorescent region, and the angle in which the region of the diffusion layer which is arranged corresponding to the fluorescent region diffuses light is smaller than the angle in which the region of the diffusion layer which is arranged corresponding to the transmission region diffuses light, allowing the excitation laser incident onto the fluorescent region for exciting fluorescence to be diffused. However, the diffusion carried out herein is mainly to homogenize rather than diverging the excitation laser into a large angle. If blue laser serves as the excitation light, blue laser firstly arrives at the diffusion layer for homogenization via diffusion by the diffusion layer before being incident onto the fluorescent region for exciting fluorescence. The process is favorable in that, unevenness in the density of laser beams emitted by a laser device, which is especially the case when optical density increases if large laser spots are reduced to ones with smaller areas, will give rise to over concentration of local optical energy, therefore, using such laser spots to excite a fluorescent wheel may burn and damage the fluorescence powder layer, thus reducing the excitation efficiency of fluorescence. As a result, when the excitation laser beams pass through the above diffusion layer, energy of the light beams is able to be homogenized, and the optical energy density distribution gets even, thereby preventing the fluorescence powder layer from damage.

In addition, the full-circle shape of the above diffusion layer may avoid the issue of counterweight to the entire fluorescent wheel stemming from being arranged merely corresponding to the transmission region. The reason for this is that, if the fluorescent wheel is heavier in locality, for example, a diffusion layer is arranged for merely the transmission region, and the transmission region is merely part of the outer circumference or one sector of the fluorescent wheel, the center of gravity of the entire fluorescent wheel structure may be offset, and inconsistency of the center of gravity with the rotation center will make the fluorescent wheel unable to rotate at a uniform speed, affecting the working stability of the fluorescent wheel, which requires to fulfill the purpose of counterweighting via an extra counterweighting measure, such as forming a groove in a region of a metal support plate of the fluorescent wheel or reducing the weight of a metal pressing sheet. In addition, when being a length of arc, namely part of a circular component, the diffusion layer has relatively high requirements for processing, and processing and assembly accuracy of adhesive bonding, while the difficulty in processing and mounting the entire circular component is significantly reduced.

In addition, the above circular shape may also be a hollowed shape in a region near the center of the circle. When the same shape is adopted, the circular shape may also be riveted together with the fluorescent wheel, as well as a rotating shaft of a driving motor of the fluorescent wheel via a rivet, or additionally assisted with fixation via dispensing at the riveting position.

In addition, in accordance with different lasers and distinguishment among the working purposes, different laser diffusion regions may be likewisely arranged on the above circular diffusion layer respectively in a manner as described in the above embodiment, and will not be repeated.

To sum up, in the embodiments of the disclosure, the diffusion layer is arranged corresponding to both the transmission region and the fluorescent region, and the angle in which the region arranged corresponding to the fluorescent region diffuses light is smaller than of the angle in which the region arranged corresponding to the transmission region diffuses light, allowing to remove speckles for laser incident onto the transmission region, and on the other hand, to homogenize the excitation laser incident onto the fluorescent region, thus improving the operational safety of the fluorescent wheel as well as the fluorescence excitation efficiency.

In addition, the transmission-type fluorescent wheel provided by technical solutions of embodiments of the disclosure, is able to sequentially transmit fluorescence and laser; the diffusion layer, which is arranged on the surface of the fluorescent wheel, at least corresponds to the transmission region, allowing laser to be diffused by the diffusion layer for speckle removal before being transmitted by the transmission region, sparing a separate speckle-removing component. The fluorescent wheel provided by technical solutions of embodiments of the disclosure combines and outputs the first laser, the second laser and the fluorescence in the same direction, and speckles of the first laser and the second laser are removed by the one fluorescent wheel component, improving the light processing efficiency of the fluorescent wheel.

Figure 15:
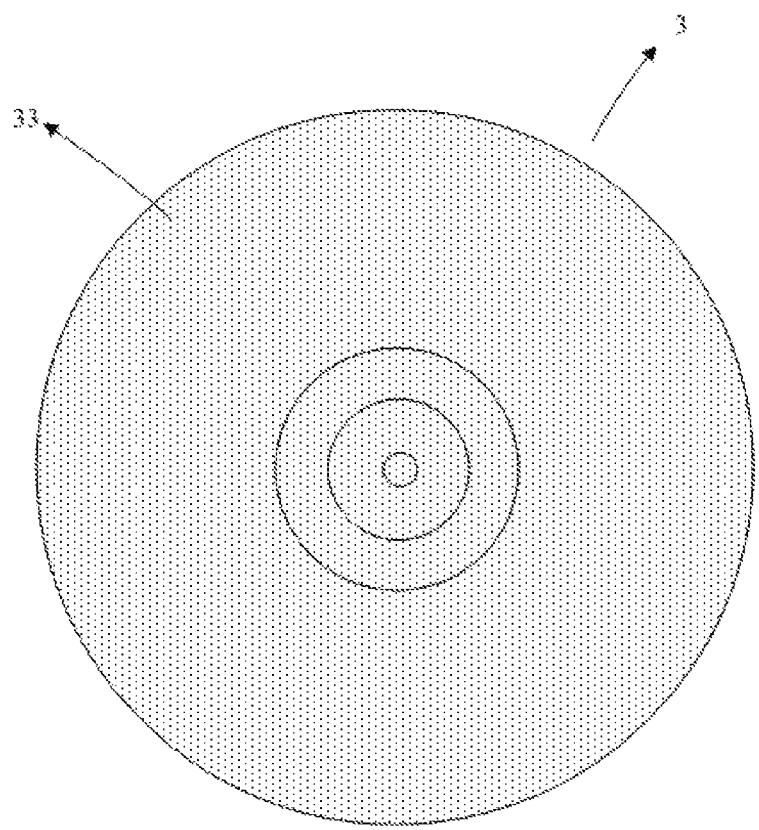
FIG. 15 is a planar distribution diagram of a fluorescent wheel with a diffusion layer provided by another embodiment of the disclosure.

In accordance with an embodiment of the disclosure, the diffusion layer on the fluorescent wheel is disc-shaped, and has roughly the same area as that of the entire fluorescent wheel, while covering the fluorescent region, the transmission region and a rotating shaft connection region of a central motor of the fluorescent wheel, as shown in FIG. 15.

Figure 16:
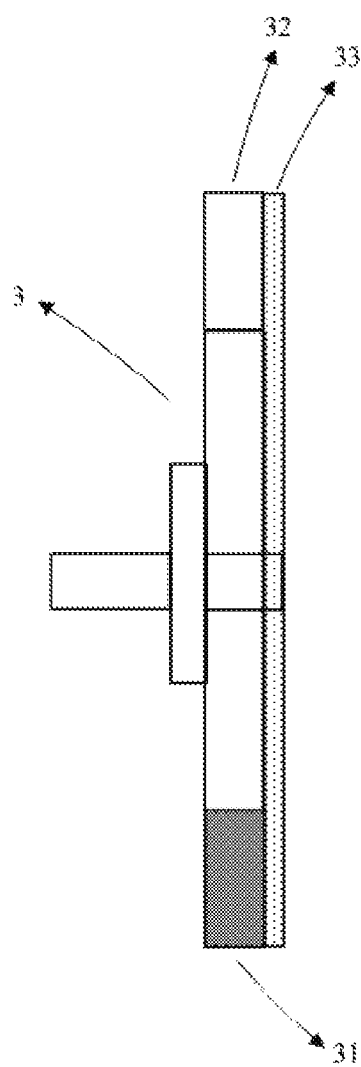
FIG. 16 is a cross-sectional structure diagram corresponding to FIG. 15.

FIG. 16 is a cross-sectional structure diagram of FIG. 15, it can be seen from the two figures that, the diffusion layer 33 has the same area as the substrate of the fluorescent wheel, while covering the fluorescent region 31 and the transmission region 32.

The diffusion layer 33, preferably, is prepared from one frosted glass or diffusion component, the frosted glass material, selected from fused quartz or K9, may take shape via photolithography with a model, and the outer surface on the laser incident side may be a rough surface, while the inner surface may be a smooth surface.

Compared with the circular diffusion layer in the above embodiment, it is less difficult for the disc-shaped diffusion layer in the embodiment of the disclosure to be processed. As for fixation, the transmission region, the fluorescent region and the diffusion layer are not necessarily fixed via bonding, and as a whole component, the practice may be carried out by merely punching a hole through the central region of the diffusion layer for allowing the rotating shaft region of a central motor of the fluorescent wheel to be connected through riveting fixation, or additionally assisted with fixation via dispensing at the riveting position, which ensures that the diffusion layer is closely fitted with the fluorescent region and the transmission region of the fluorescent wheel, while keeping the diffusion layer static relative to the fluorescent wheel and allowing the diffusion layer to conduct synchronous rotation as a part of the fluorescent wheel by strengthening the fixation of the diffusion layer. The diffusion layer component, being a one-piece component with an area roughly the same as that of the fluorescent wheel, is evenly distributed across the surface of the entire fluorescent wheel in term of weight. When the fluorescent wheel rotates, the diffusion layer is not likely to partially offset because of rotation of the fluorescent wheel and the resultant centrifugal force, such that the diffusion effect or working stability of the fluorescent wheel is free from influence.

In addition, in an embodiment of the disclosure, in accordance with different laser and the distinguishment between the working purposes, different laser diffusion partitions may be arranged in the region where the diffusion layer corresponds to the transmission region, please refer to the above embodiment for the specific implementations which will not be repeated herein. In the embodiment of the disclosure, the diffusion layer also covers the fluorescent region, and likewise carries out diffusion homogenization of laser incident onto the fluorescent region; and different regions of the diffusion layer corresponding to the fluorescent region and the transmission region may be arranged to diffuse light in different divergence angles, in reference to the arrangement of diffusion regions corresponding to different light divergence angles in the above embodiments.

In an embodiment of the disclosure, the diffusion layer, i.e., a one-piece component, makes a structure capable of reducing the difficulty in processing the component, besides delivering the speckle-removing effect for laser via diffusion in the above embodiment, and is fixed in a simpler and more efficient manner by performing the fixation and installation via riveting, and last but not the least, improves the working stability of the fluorescent wheel by bypassing the problem of couterweighting due to arrangement in locality on the surface of the fluorescent wheel.

To sum up, in the above embodiments, a diffusion layer is arranged on the outer surface of the fluorescent wheel, the diffusion layer is arranged corresponding to the transmission region, conducts periodic rotation motion along with the fluorescent wheel, and is capable of removing speckles of laser before the laser is incident onto the transmission region; in addition, in accordance with different sensitivities of human eyes to laser speckle phenomenon, the diffusion layer is partitioned, and arranged to diffuse light in different divergence angles in different partitions, so as to achieve balance between image speckle effects observed by the human eyes from different laser; in addition, the diffusion layer is arranged corresponding to the fluorescent region, and the light divergence angle corresponding to the fluorescent region is arranged to be smaller than that corresponding to the transmission region, so as to conduct diffusion homogenization to a low extent for the excitation laser incident onto the fluorescent region, thus increasing the excitation efficiency of fluorescence and working safety of the fluorescent wheel; the diffusion layer is arranged to have different shapes, and symmetric patterns such as an annulus or a disc are employed, so as to avoid the offset problem caused by counterweight and movement of the fluorescent wheel due to arrangement of the diffusion layer in locality on the fluorescent wheel, in the meantime, when the diffusion layer is arranged to be disc-shaped, the diffusion layer may be fixed with the fluorescent wheel via riveting the central region of the diffusion layer with the fluorescent wheel simply and reliably; and the above fluorescent wheel is capable of realizing transmission of laser and fluorescence, and removes speckles for laser meanwhile, thus improving the light processing efficiency of the fluorescent wheel.

A double-color laser source is further provided by an embodiment of the disclosure, as shown in FIG. 14 The double-color laser source includes a laser source portion 1, and further includes a blue laser device and a red laser device, for respectively emitting blue laser and red laser; the double-color laser source also includes a fluorescent wheel 3 and a first focusing optical path system 2, where the first focusing optical path system 2 is used to focus laser beams with large angles emitted by the blue laser device and the red laser device and reduce the laser beams to light beams with predetermined small angles for incidence onto the fluorescent wheel 3.

The fluorescent wheel may be a fluorescent wheel described by any of the above embodiments. Specifically, in accordance with an implementation, the fluorescent wheel 3 may include a green fluorescence powder region; with the short wavelength, blue laser is selected as the excitation light in accordance with the principles of energy transition and wavelength conversion, for exciting green fluorescence powder to generate green fluorescence; where, a substrate in a green fluorescence powder region on the fluorescent wheel 3 is a transparent substrate, the blue laser incident side of which is coated to form a coating film; the coating film, i.e., a coating capable of transmitting blue light and reflecting green light with high efficiency, is able to perform wavelength selection, so as to transmit blue laser and reflect green fluorescence generated under excitation; in addition, green fluorescence reflected off the coating film is further transmitted by the transparent substrate to emit outwards in the same direction as the incident direction of blue laser. In addition, the fluorescent wheel 3 includes a transmission region, where the transmission region is a diffusion component, meaning the transmission region is prepared from a diffusion component material, for transmitting and diffusing red laser and blue laser passing through the diffusion component structure. In addition, in accordance with the difference between the light divergence angles, the diffusion component is provided with a red light diffusion region and a blue light diffusion region, wherein the red light diffusion region diffuses light in a divergence angle larger than that of the blue light diffusion region. Specifically, the arrangement of the red light diffusion region 321 and the blue light diffusion region 322 are illustrated in FIG. 6, FIG. 7 and FIG. 8. The arrangement of different light divergence angles may be realized by coating the diffusion component with a diffuser with different densities, or processing to form a micro-structure with different densities or bulges varied in sizes.

Red laser, blue laser and green fluorescence are sequentially outputted by the fluorescent wheel 3, and then undergo collimation and focusing to enter a light stick for providing illumination for an optical engine. Specifically, red laser, blue laser and green fluorescence are emergent from the back of the fluorescent wheel, and are collimated by a collimation lens group. Compared with laser, fluorescence has a poorer directivity and a larger divergence angle; and after being focused and incident onto the fluorescent wheel, laser is emergent in a diverged state during emergence, in accordance with the principle of light propagation along a straight line, therefore, the diverged light beams require to be collimated.

In addition, the light stick requires a certain incident angle, which resists light beams beyond the incident angle of the light stick access to the light stick, causing optical loss, as a result, the combined light beams are focused before entering the light stick to reduce the angle thereof, thus improving the efficiency of a light source incident into a light stick, so that the maximum optical energy can enter a light guide device of the light stick, thereby providing high brightness illumination for an optical engine component.

The structure and operation process of the double-color laser source will be detailed as follows combining an example in FIG. 18.

Figure 18:
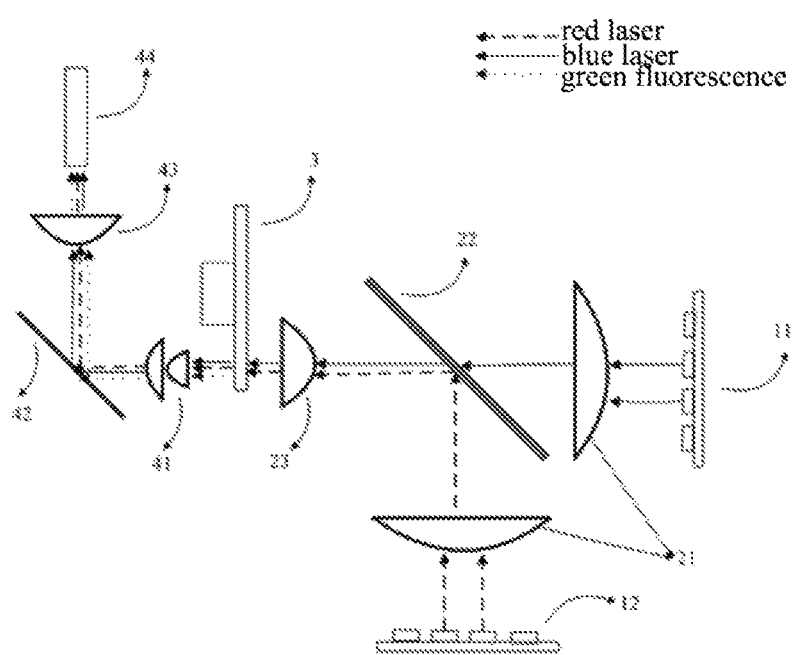
FIG. 18 is a specific structural diagram of a double-color laser source provided by an embodiment of the disclosure.

As shown in FIG. 18, the laser source portion 1 includes a blue laser device 11 and a red laser device 12. Although with excellent directivity, laser is not exactly parallel light beams due to the presence of divergence angles to a certain point. At the present, the diameter of laser spots emitted by a laser device is around 60 mm, as fluorescence requires laser spots with high energy in light beams with a small area to be excited, and light spots with overlarge energy density tend to burn the fluorescence powder, therefore, laser beams emitted from a laser device need to be subject to shaping, including processes such as beam-shrinking, homogenization etc., to satisfy technical requirements for excitation of fluorescence. In an embodiment of the disclosure, the diameter of laser spots used for fluorescence excitation is controlled at 0.8 mm or so, as a result, blue laser and red laser emitted by the blue laser device 11 and the red laser device 12 require to undergo a shaping process for reducing the light spots.

In a specific implementation, a telescope system, i.e., one large convex lens and one concave lens (where focus points of the convex lens and the concave lens are coincident) may be employed to conduct shaping via beam-shrinking, and one convex lens or a combination of two convex lenses is placed in front of the incident side of the fluorescent wheel, for focusing the light beams after beam shrinking to form light beams with smaller angles for incidence onto the surface of the fluorescent wheel, while meeting the requirement for the size of light spots received by the surface of the fluorescent wheel.

In addition, in a specific implementation, as shown in FIG. 18 of an embodiment of the disclosure, a first focusing optical path system 2 is used to focus laser beams with large angles into high energy light beams with small angles. Where, the first focusing optical path system 2 includes a first focusing lens group 21 and a second focusing lens 23, where the first focusing lens group includes two first focusing lenses, namely, two first convex lens respectively arranged on the emergent optical paths of the blue laser device 11 and the red laser device 12. Since light beams or light spots with large angles emergent from a laser device need a process of first focusing, the first focusing lens has a plane large enough for receiving light beams or light spots with a large area. After being focused by the first focusing lens group 21, the blue laser and red laser beams have already been converged to a certain extent. And in order to reach the requirement for fluorescence to be excited, the fluorescent wheel needs to be arranged at one-focal-length position of the first focusing lens, which does not satisfy the demand for the design of the system volume, as a result, a second focusing lens is also arranged, for example, one second convex lens is arranged near the front side of the fluorescent wheel 3, namely, arranged near the laser incident side of the fluorescent wheel, for conducting secondary focusing of the blue laser and red laser beams for incidence thereof onto the front side of the fluorescent wheel, thus fulfilling the function of speeding up the focusing process of laser beams.

In addition, in an embodiment of the disclosure, a red laser device 12 and a blue laser device 11 are arranged vertically, two optical paths with optical axes perpendicular to each other require light combination, to be incident onto the fluorescent wheel in one direction, therefore, the first focusing optical path system 2 further includes a first light combination component 22, which, for example, may be a dichroscope, the dichroscope is arranged on focused optical paths of blue laser and red laser, is capable of delivering wavelength selection effect by transmitting blue light while reflecting red light, and is used for combining red laser and blue laser which are arranged vertically, so as to output laser beams in the same direction.

After being focused and forming small incident light spots, blue laser and red laser are sequentially incident onto the fluorescent wheel in accordance with the light-up sequence. In the embodiments of the disclosure, the double-color laser source also includes a control unit (not shown in the figures), for controlling and lighting up the blue laser device 11 in accordance with sequence, allowing the blue laser to be incident onto a green fluorescence powder region 31 and a blue light diffusion region 322 of the fluorescent wheel 3, as well as controlling and lighting up the red laser device 12, allowing the red laser to be incident onto a red light diffusion region 321.

In a specific implementation, considering requirements for white balance and brightness of a light source of a display system, in one cycle, red light, blue light and green light are lighted up in certain cycle time, respectively. Taking a display frequency of 120 Hz as an example, one cycle is T=8.3 ms, i.e., the time it takes for the fluorescent wheel to rotate one revolution, which is also a time cycle during which the whole group of laser sources are sequentially lighted up. In a time period of T=8.3 ms, a control unit controls the light-up time of the blue laser device at about 70% of the entire cycle, during the light-up time of the blue laser device, where a time period equal to 50% T is used to excite the fluorescent region to generate green fluorescence, a remaining time period equal to 20% T is used to transmit blue laser through the transmission region, and the control unit controls the light-up time of the red laser device at about 30% of the entire cycle, correspondingly, the central angles of the red light diffusion region 321, the blue light diffusion region 322, and the green fluorescent region 31 on the fluorescent wheel are 108, 72, and 180 degrees, accounting for about 30%, 20% and 50%, respectively, of the fluorescent wheel in term of proportion. Where the great proportion of green fluorescence helps to boost the brightness of the entire light source.

Figure 19:
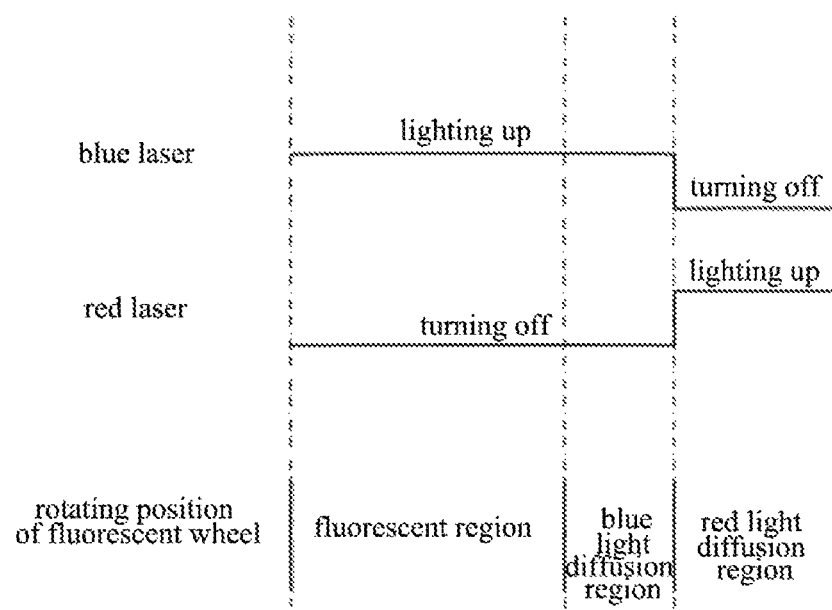
FIG. 19 is an operation sequence diagram of a double-color laser source provided by an embodiment of the disclosure.

As shown in FIG. 19, during the period when the blue laser device is lighted up, the red laser device is turned off, when the fluorescent wheel rotates to the green fluorescent region, the blue laser excites the fluorescence powder to generate fluorescence, therefore, green fluorescence is outputted by the fluorescent wheel during this time period of 50% T; when the fluorescent wheel rotates to the blue light diffusion region, blue laser transmits through the diffusion component (which also serves as a transmission region) to be transmitted, as a result, blue laser is outputted by the fluorescent wheel during this time period of 20% T; when the blue laser device is turned off and the red laser device is lighted up, the fluorescent wheel rotates to the red light diffusion region, likewise, red laser transmits through the diffusion component (which also serves as a transmission region) to be transmitted, so red laser is outputted by the fluorescent wheel during this time period of 30% T, thereby light of three colors is outputted in the same direction via one fluorescent wheel component, sparing the need for optical design in periphery to conduct optical path conversion and combination.

As described above, blue laser, red laser and green fluorescence outputted by the fluorescent wheel require collimation and focusing to be incident into a light stick, for providing illumination for an optical engine component connected with the light source.

Figure 17:
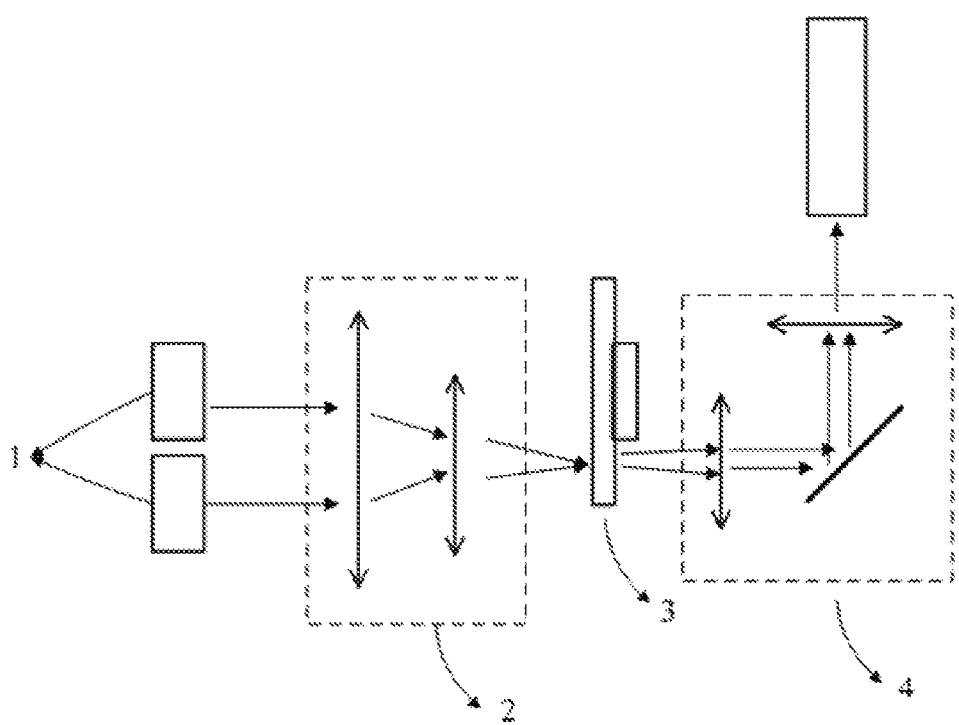
FIG. 17 is an architectural diagram of a double-color laser source provided by an embodiment of the disclosure.

As shown in FIG. 18, the sequentially emitted blue laser, red laser and green fluorescence firstly pass through a first collimation lens group 41 arranged on the rear side of the fluorescent wheel 3 (i.e., the opposite side of the laser incident side), for these light beams with divergence angles to be collimated. Where a second reflector 42 is a planar reflector, for converting directions of the optical paths of blue laser, red laser and green fluorescence, thereby allowing the three-primary-color light to be eventually outputted in a direction towards a light guide device of the light stick, where the second reflector 42 is not necessary if there is no need for converting the optical paths, and the second reflector 42 enables the three-color light beams reflected by the second reflector 42 to arrive at a third focusing lens 43, which is used to focus blue laser, red laser and green fluorescence for the last time before they enter the light stick, where the first collimation lens group 41, the second reflector 42 (optional), and the third focusing lens 43 form a collimation and focusing optical path system 4 as shown in FIG. 17. The light stick is a generally used light guide device or light collection device, for receiving light beams of blue laser, red laser and green fluorescence focused by the third focusing lens 43, and outputting the light for illumination. In an embodiment of the disclosure, light beams with divergence angle being offset from the optical axis by more than 25 degrees are not able to enter the light stick, all other light beams can enter the light stick, and the quantity of light entering the light stick determines the brightness of a light source for illumination, therefore, in order to enable the light beams to enter the light stick as much as possible, light beams of various colors outputted by the fluorescent wheel require secondary focusing, so as to reduce the incident angle to meet the requirement of the light stick for the angle, and provide a light source for illumination with high brightness.

To sum up, the double-color laser source provided by the embodiments of the disclosure includes a blue laser device and a red laser device for respectively emitting blue laser and red laser, and also includes a fluorescent wheel, a diffusion component is arranged in a transmission region of the fluorescent wheel, and conducts periodic motion along with rotation of the fluorescent wheel as a part of the fluorescent wheel, the diffusion component structure functions as a moving diffusion sheet, so as to transmit double-color laser while performing speckle-removal via diffusion at the same time using one fluorescent wheel component, sparing a separate speckle-removing component, for example, designs like an optical fiber, a random phase plate and a driving circuit, thus simplifying the design of the speckle-removing optical path in an optical architecture, and providing high quality illumination for an optical engine.

Figure 2:
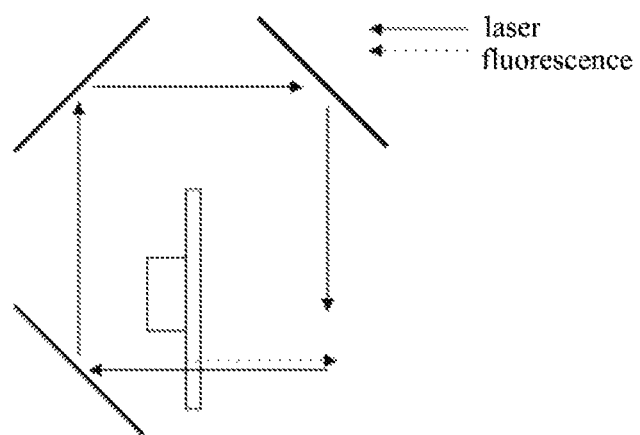
FIG. 2 is a optical path diagram of fluorescence reflected by a fluorescent wheel.

Instead of employing a reflection-type fluorescent wheel to reflect fluorescence as shown in FIG. 2, the fluorescent wheel is used to transmit the fluorescence, and multiple optical lenses are arranged on one side of the fluorescent wheel to constitute a laser circuit, so that laser is combined with the fluorescence reflected back by the fluorescent wheel, thereby simplifying the design of optical path for optical path combination in periphery of the fluorescent wheel.

During the application of solutions of the embodiments in the disclosure to a double-color laser source, there is no need to arrange a light combination circuit and a speckle-removing optical path dedicated to red laser on the basis of a single-color laser source, instead, a diffusion component is used to respectively transmit red and blue laser, and combine and output the double-color laser and fluorescence in the same direction in the case where blue laser, red laser, and green fluorescence propagates over a short optical path. The designs for the speckle-removing optical path of the double-color laser and the combination of the three-primary-color light are carried out through one component, improving the light processing efficiency of the fluorescent wheel, while simplifying the design for an auxiliary optical path in periphery, and reducing usage of optical components, thereby contributing to a decrease in the complexity and volume of the optical architecture of a double-color laser source, and in turn favoring miniaturization of a projection equipment.

Figure 20:
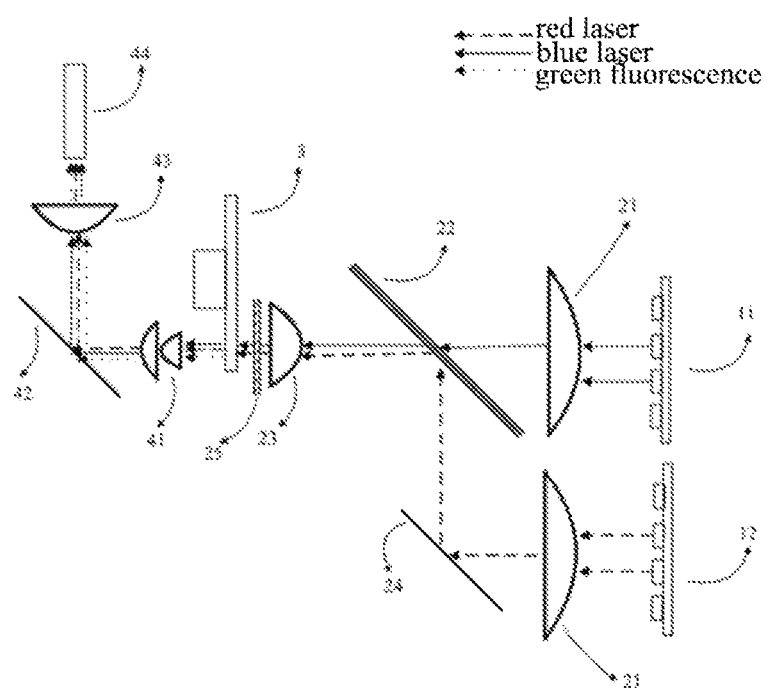
FIG. 20 is a specific structural diagram of a double-color laser source provided by another embodiment of the disclosure.

In accordance with an embodiment of the disclosure, a blue laser device 11 and a red laser device 12 in a laser source portion 1 are arranged in parallel, rather than in a vertical manner, as shown in FIG. 20. It should be noted that, the arrangement fashion of the blue laser device and the red laser device exerts no influence on the substantial object of the technical solutions of the disclosure, except that when the two are vertically arranged, a heat dissipation component for the laser source may be arranged in a space between an included right angle formed by the two, for respectively dissipating heat for the laser devices of two colors, whereas in the case of parallel arrangement, the heat dissipation component requires to be arranged above or below the two laser devices, for dissipating heat for the laser devices of two colors at the same time; in addition, in the case of parallel arrangement, one reflector 24 needs to be arranged behind a first focusing lens for the red laser device 12 since the light is to be incident into a first light combination component 22, so as to convert the optical path direction, allowing red laser to be outputted to the first light combination component 22 before being combined with blue laser.

In addition, laser spots have decreased area and large energy density after being focused by two convex lenses in the first focusing optical path system, and a result of uneven energy distribution of light spots emitted by a laser device is unduly large optical energy density in the locality due to formation of small light spots, and the surface of the fluorescent wheel is likely to be burned if the light spots directly irradiate onto the surface of the fluorescent wheel, going against the transformation of fluorescence. As a result, preferably, a second diffusion sheet 25, which is further arranged between the fluorescent wheel and the second focusing lens, may be fixedly arranged, and is mainly used for diffusion homogenization of the blue laser spots, thus realizing the goal of evenly distributing the optical density of the light spots, and avoiding causing burns due to local overheat when the blue laser spots are incident onto the surface of the fluorescent wheel.

In addition, light from the red laser source may also transmit the fixedly arranged diffusion sheet, the fixedly arranged diffusion sheet and the rotating diffusion component on the fluorescent wheel also deliver a double diffusion effect via cooperation of the static sheet and the moving component for blue laser and red laser, in which the fixedly arranged diffusion component increases the laser spatial phases, and the moving diffusion component further increases random spatial phases, thereby boosting the effect of undermining the conditions for interference, and improving the speckle-removing effect.

In the embodiment, beneficial effects as described in the above embodiment are delivered, and it is possible to homogenize laser beams incident onto the fluorescent wheel due to the additionally arranged second diffusion sheet 25, which can improve the safety in conversion of the fluorescence, and constitute a double speckle-removing system with the rotating diffusion component on the fluorescent wheel at the same time, thus improving the speckle-removing effect for both blue laser and red laser.

In accordance with another implementation, a fluorescent wheel in a double-color laser source may adopt the fluorescent wheel structure including a diffusion layer described in the above embodiment, namely, a diffusion layer is arranged on the surface of the fluorescent wheel, where a diffusion layer is arranged on the surface of the fluorescent wheel at a position corresponding to the transmission region, and a diffusion layer is also arranged on the surface of the fluorescent wheel at positions corresponding to both the transmission region and the fluorescent region, and a disc-shaped diffusion layer is arranged on the surface of the fluorescent wheel, and the like. Preferably, the diffusion layer corresponds to both the transmission region and the fluorescent region, and the transmission region includes a red laser transmission region and a blue laser transmission region, the diffusion layer correspondingly includes a red laser diffusion region and a blue laser diffusion region, and the specific partition and structure is referred to the above embodiment, and will not be repeated herein.

Blue laser and red laser sequentially transmit through the diffusion layer and transmission region of the fluorescent wheel to emit outwards, in accordance with the light-up sequence of the laser devices and the rotation sequence of the fluorescent wheel.

The fluorescent wheel 3 includes a green fluorescence powder region, which is formed from curing mixed green fluorescence powder and an inorganic material. The green fluorescence powder region is transparent. Blue laser acts as excitation laser, can excite the green fluorescence powder to emit green fluorescence.

A dichroic film may be coated on the surface of the green fluorescence powder region, or coated on the inner surface of the diffusion layer, the film is a coating for transmitting blue light and reflecting green light with high efficiency, and is used to transmit blue laser and reflect green fluorescence generated under excitation; in addition, green fluorescence reflected off the coating film further transmits through the transparent fluorescent region and is emergent in the same direction as the incident direction of blue laser.

After being sequentially outputted by the fluorescent wheel 3, red laser, blue laser and green fluorescence also pass through a collimation and focusing optical path system 4 to enter a light stick (not shown in the figures), for providing laser illumination for an optical engine.

Since fluorescence has poorer directivity than laser, and has a large divergence angle, adding to the fact that, laser is emergent in a divergent state during emergence, in accordance with the principle of light propagation along a straight line, after being focused and incident onto the fluorescent wheel, it requires to collimate the diverged light beams.

In addition, because a light stick requires a certain incident angle, which resists light beams beyond the incident angle of the light stick access to the light stick, thus causing optical loss, as a result, in order to increase the efficiency of a light source incident into a light stick, the combined light beams are focused before entering the light stick to reduce the angle of the light beams, so that the maximum optical energy can enter a light guide device of the light stick, and provide high brightness illumination for a subsequent optical engine component. The structure and operation process of the double-color laser source will be detailed as follows in combination with an example as shown in FIG. 18, where the part identical with that in the above embodiment will not be repeated.

After being focused by a first focusing optical path system 2 to form incident light beams with a small angle, blue laser and red laser are sequentially incident onto the fluorescent wheel in accordance with the light-up sequence. In the embodiment of the disclosure, the double-color laser source also includes a control unit (not shown in the figures), for controlling and lighting up a blue laser device 11 for blue laser thereof being incident onto a fluorescence diffusion region corresponding to a green fluorescent region 31, and a blue light diffusion region corresponding to a transmission region 32, of the diffusion layer on the fluorescent wheel 3 in accordance with sequence, as well as for controlling and lighting up a red laser device 12 for red laser thereof being incident onto a red light diffusion region, so as to be eventually sequentially incident onto a fluorescent region and a transmission region on the fluorescent wheel.

In a specific implementation, taking into account of requirements for the white balance and brightness of a light source of a display system, in one cycle, red light, blue light and green light are lighted up in certain cycle time, respectively. Taking a display frequency of 120 Hz as an example, one cycle is T=8.3 ms, i.e., the time it takes for the fluorescent wheel to rotate one revolution, which is also a time cycle during which the whole group of laser sources are sequentially lighted up. In a time period of T=8.3 ms, a control unit controls the light-up time of the blue laser device at about 70% of the entire cycle, during the light-up time of the blue laser device, a time period equal to 50% T is used to excite the fluorescent region to generate green fluorescence, a remaining time period equal to 20% T is used to transmit blue laser through the transmission region, and the control unit controls the light-up time of the red laser device at about 30% of the entire cycle, correspondingly, the central angles of the red light diffusion region 331, the blue light diffusion region 332, and the green fluorescent region 31 on the fluorescent wheel are 108, 72, and 180 degrees, accounting for about 30%, 20% and 50%, respectively, of the fluorescent wheel in term of proportion. Where the great proportion of green fluorescence helps to boost the brightness of the entire light source.

Figure 21:
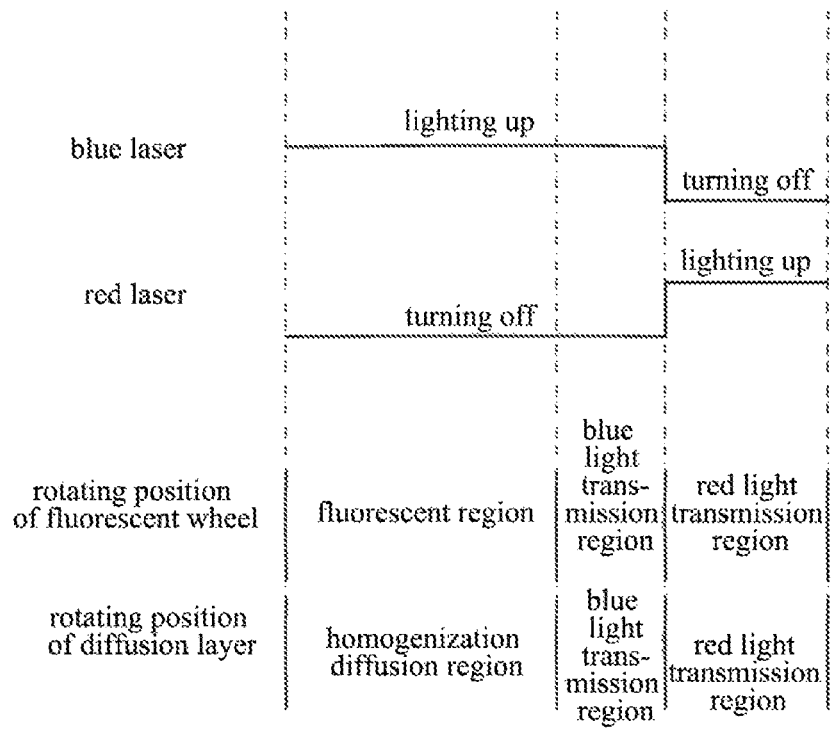
FIG. 21 is an operation sequence diagram of a double-color laser source provided by another embodiment of the disclosure.

As shown in FIG. 21, during the period when the blue laser device is lighted up, the red laser device is turned off, when the fluorescent wheel rotates to the green fluorescent region, the diffusion layer is kept static relative to the fluorescent wheel, and is located at a position within the homogenization diffusion region corresponding to the fluorescent region, allowing blue laser to firstly pass through the homogenization diffusion region of the diffusion layer, and to arrive at the fluorescent region to excite fluorescence powder to generate fluorescence, therefore, in a time period equal to 50% T, green fluorescence is outputted by the fluorescent wheel; when the fluorescent wheel rotates to the blue light transmission region, the diffusion layer is located in the blue light diffusion region, allowing blue laser to be firstly diffused by the blue light diffusion region of the diffusion layer, and to enter the blue light transmission region on the fluorescent wheel, therefore, in a time period equal to 20% T, blue laser is outputted by the fluorescent wheel; when the blue laser device is turned off and the red laser device is lighted up, the fluorescent wheel rotates to the red light transmission region, and the diffusion layer is located in the red light diffusion region, likewise, allowing red laser to firstly transmit through the red light diffusion region of the diffusion layer, and to enter the red light transmission region on the fluorescent wheel to be transmitted, therefore, in a time period equal to 30% T, red laser is outputted by the fluorescent wheel; in this manner, light of three colors is outputted in one direction via one fluorescent wheel component, sparing an optical design for converting and combining optical path in the periphery of the fluorescent wheel.

To sum up, the double-color laser source provided by the embodiments of the disclosure includes a blue laser device and a red laser device, for respectively emitting blue laser and red laser, where the double-color laser source also includes a fluorescent wheel, a diffusion layer, arranged on the surface of the fluorescent wheel, is capable of rotating along with the rotating fluorescent wheel according to working characteristics of the latter during rotation as a part thereof, when the diffusion layer is at least arranged corresponding to the transmission region, so that the diffusion layer functions as a moving diffusion sheet, allowing laser to be diffused by the diffusion layer before transmitting through the fluorescent wheel. The very one fluorescent wheel component is able to transmit laser while conducting speckle removal via the diffusion, sparing a separate speckle-removing component, and simplifying the design for the speckle-removing optical path of a light source system, and is able to provide high quality illumination for an optical engine. In addition, when also being arranged corresponding to the fluorescent region, the diffusion layer is able to remove speckles for the transmission laser via diffusion, and carries out diffusion homogenization for excitation laser incident onto the fluorescent region at the same time, thus improving the excitation efficiency of fluorescence, and sparing a component dedicated to homogenization of excitation laser in an optical architecture.

In addition, in the embodiment of the disclosure, two kinds of laser are sequentially transmitted through the transmission region of the fluorescent wheel, thus simplifying the design for combining the double-color laser, and laser diffusion regions corresponding to different divergence angles are arranged on the diffusion layer, which is able to conduct targeted speckle removal in accordance with different speckle effects of red laser and blue laser, so as to balance the speckle-removing effect. The fluorescent wheel in the embodiment of the disclosure is a transmission-type fluorescent wheel, and the fluorescent region is formed via curing mixed fluorescence powder and an inorganic material, making it possible to address the problem of low fluorescence conversion and heat dissipation efficiencies due to the practice of mixing fluorescence powder and adhesive in the prior art. The transmission-type fluorescent wheel is able to transmit fluorescence, in a double-color laser source of the embodiment of the disclosure, red laser, blue laser and green fluorescence are sequentially outputted according to rotation sequence of the fluorescent wheel, so as to use one fluorescent wheel component to combine and output light of three primary colors, and is conducive to reducing the complexity of the optical architecture of a double-color laser source, thus favoring miniaturization of a projection equipment.

Figure 22:
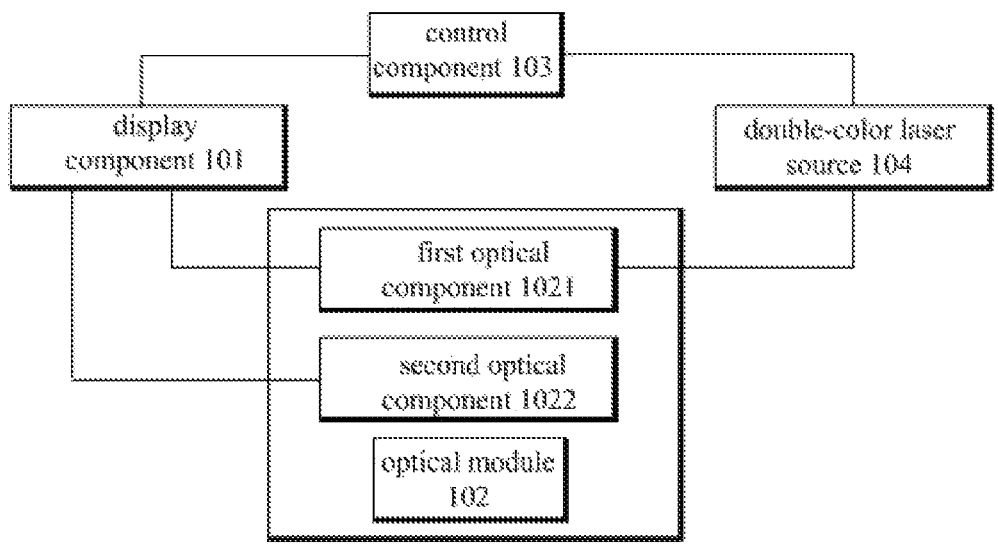
FIG. 22 is a structural block diagram of a laser projection equipment provided by an embodiment of the disclosure.

An embodiment of the disclosure also provides a laser projection equipment, as shown in FIG. 22, including a display component 101, an optical module 102, a control component 103 and a double-color laser source 104 as described in the above solution, where the optical module 102 further includes a first optical component 1021 for guiding light from the double-color laser source 104 towards the display component 101, and a second optical component 1022 for projecting light emitted by the display component 101 onto a screen, the control component 103 is used to control the display component 101 and the double-color laser source 104.

The double-color laser source 104 may be a double-color laser source described by any of the above embodiments. The double-color laser source may include a laser source portion 1, which further includes a blue laser device and a red laser device, for respectively emitting blue laser and red laser; the double-color laser source also includes a fluorescent wheel 3 and a first focusing optical path system 2, where the first focusing optical path system 2 is used to focus laser beams with large angles emitted by the blue laser device and the red laser device, and reduce to light beams with predetermined small angles, to be incident onto the fluorescent wheel 3, and the double-color laser source further includes a collimation and focusing optical path system 4 composed of a first collimation lens group 41, a second reflector 42 (optional), and a third focusing lens 43. Where the fluorescent wheel 3 may be a fluorescent wheel for at least diffusing laser to be transmitted as described in any of the above embodiments.

Figure 23:
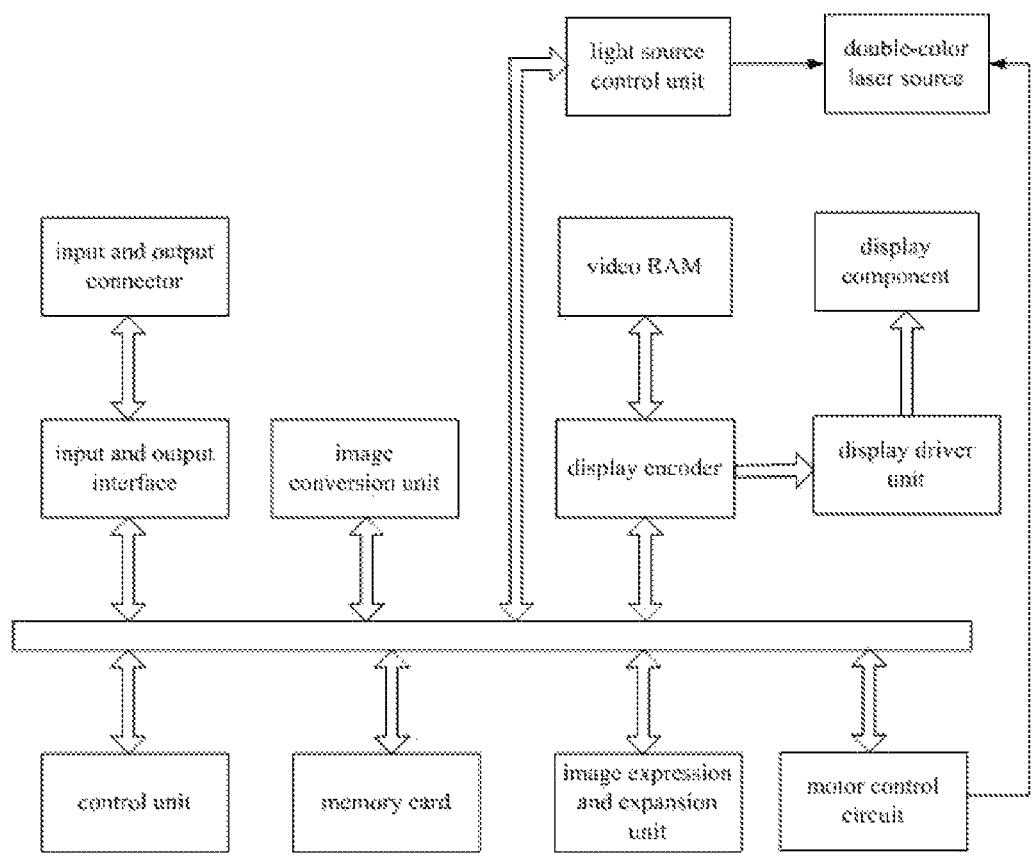
FIG. 23 is a functional module diagram of a laser projection equipment provided by an embodiment of the disclosure.

The structure and operation process of the laser projection equipment will be detailed in conjunction with a functional module diagram of laser projection equipment as shown in FIG. 23.

As shown in FIG. 23, specifically, the control component 103 of the laser projection equipment is composed of a control unit, an input and output interface, an image conversion unit, a display encoder, a display driver unit and the like. Where, image signals of various formats inputted from an input and output connector are converted by the image conversion unit into image signals with a specified format suitable for display and outputted to the display encoder, via the input and output interface and a system bus. Additionally, on the basis of expanding and storing the inputted image signals in a video RAM, the display encoder generates video signals in accordance with content stored by the video RAM, and outputs the video signals to the display driver unit. Corresponding to the image signals outputted by the display encoder, the display driver unit drives the display component 101 with an appropriate frame frequency, and allows light beams emitted from the double-color laser source 104 to be incident onto the display component 101 via a first optical component 1021 of the optical module 102, so as to form an optical image from the light reflected by the display component 101, and to allow the image to be projected for display on a screen (not shown in the figures) via a lens group of a projection system serving as a second optical component 1022.

In addition, an image compression and expansion unit performs data compression to brightness signals and color difference signals of the image signals, and sequentially writes the signals in a memory card serving as a recording medium. Further, in a reproduction mode, the image compression and expansion unit reads out the image data recorded on the memory card, expands all the image data constituting a series of animation with one frame as a unit, and outputs the image data via the image conversion unit to the display encoder, which enables the animation to be displayed in accordance with the image data stored on the memory card.

The control unit of the control component 103 is used to control actions of each circuit in the laser projection equipment, including processing operations from both buttons on a housing panel of the laser projection equipment and buttons from a remote control, as well as processing of voice and the like. In addition, the control unit also allows a control circuit of the light source to conduct time division control for the double-color laser source 104 to emit red laser, blue laser and green fluorescence based on the image signals, and allows a motor to drive the fluorescent wheel to rotate under control of a motor control circuit.

An optical system unit is further arranged on the laser projection equipment. The optical system unit is composed of an illumination side module located near the double-color laser source 104, an image generation module located on the back panel side, and a projection side module located between the illumination side module and a side panel. The illumination side module includes part of the first optical component 1021 for guiding light emitted by the double-color laser source 104 towards the display component 101 included in the image generation module. The first optical component 1021 of the illumination side module is provided with a light guide device for allowing the light beams emitted by the double-color laser source 104 to become light beams with evenly distributed intensity, as well as a converging lens for converging light transmitting through the light guide device, and the like. The image generation module, as the first optical component 1021, includes: an optical axis changing mirror, for altering direction of the optical axis of light beams emitted by the light guide device; multiple converging lenses, for converging light reflected off the optical axis changing mirror onto the display component 101; and an irradiation mirror, for irradiating the light beams transmitting through a converging lens onto the display component 101 at a specified angle. A projection side module includes a lens group of the second optical components 1022 for projecting light emitted by the display component 101 and forming an image. The second optical component 1022 includes a fixed lens group internally built in a fixed lens barrel and a movable lens group internally built in a movable lens barrel, and works as a zoomable lens with a variable focus point, capable of conducting zooming adjustment and focusing adjustment by moving the movable lens group through a lens motor.

The laser projection equipment provided by the embodiment of the disclosure includes a double-color laser source, the double-color laser source further includes a fluorescent wheel which is provided with a diffusion component (i.e., a transmission region or a surface of the fluorescent wheel), and the diffusion component, as a part of the fluorescent wheel, conducts periodic motion along with the rotating fluorescent wheel, where the diffusion component structure functions as a moving diffusion sheet, therefore, it only takes one fluorescent wheel component to realize transmission of double-color laser while simultaneously removing speckles via the diffusion, sparing a separate speckle-removing component, for example, designs such as optical fibers, a random phase plate, a driving circuit and the like, simplifying the design for a speckle-removing optical path in an optical architecture, and is capable of providing high quality illumination for an optical engine. In addition, it is possible for double-color laser and fluorescence to be combined and outputted in the same direction, using a diffusion component for respectively transmitting red and blue laser, in the case where blue laser, red laser, green fluorescence propagate over relatively short optical paths. The solution of employing one component to realize the designs for the speckle-removing optical path of double-color laser and the combination of three-primary-color light, improves the light processing efficiency of the fluorescent wheel, simplifies the design for an auxiliary optical path in periphery, and reduces the usage of optical components, thereby contributing to a decline in the complexity and volume of the optical architecture of a double-color laser source, which in turn favors the miniaturization of the laser projection equipment.

In addition, in the embodiment of the disclosure, the transmission region of the fluorescent wheel is used to sequentially transmit two kinds of laser, simplifying the design for combining the double-color laser, and laser diffusion regions corresponding to different divergence angles are arranged on the diffusion layer, enabling to carry out targeted speckle removal for red laser and blue laser with different speckle effects, so as to balance the speckle-removing effect. In addition, the fluorescent wheel is a transmission-type fluorescent wheel, and is prepared by curing mixed fluorescence powder and an inorganic material, capable of solving the problem of low fluorescence conversion and heat dissipation efficiencies caused by mixing fluorescence powder and adhesive in the prior art.

Although preferable embodiments have been described in the disclosure, it is possible for those skilled in the art to make other alterations and modifications to the embodiments once getting informed of the basic creative concepts. As a result, the appended claims are meant to be construed as including the preferable embodiments and all alterations and modifications falling into the scope of the disclosure.

Obviously, various modifications and variations may be made to the disclosure by those skilled in the art without departing from the spirit and scope of the disclosure. In such way, the disclosure is meant to include modifications and variations, should the same modifications and variations made to the disclosure fall into the scope defined by the claims of the disclosure and the scope of the equivalent technologies.

What is claimed is:

1. A fluorescent wheel comprising a fluorescent region and a transmission region;
    wherein the fluorescent region has fluorescence powder for emitting fluorescence under excitation by second laser light and the transmission region is for transmitting first laser light and the second laser light;
    wherein the transmission region is a diffusion component, and the diffusion component comprises a first laser diffusion region for transmitting and diffusing the first laser light, and a second laser diffusion region for transmitting and diffusing the second laser light,
    wherein the second laser light is excitation laser light, and a degree to which light is diffused by the first laser diffusion region is larger than a degree to which light is diffused by the second laser diffusion region.

2. The fluorescent wheel according to claim 1, wherein the diffusion component is coated with a diffuser on a surface of the diffusion component;
    the diffusion component is formed by sand blasting; or
    the diffusion component has a micro-structure.

3. The fluorescent wheel according to claim 1,
    wherein an arc-shaped notch is arranged at an outer circumference of the fluorescent wheel, and the diffusion component is embedded in the arc-shaped notch.

4. The fluorescent wheel according to claim 1,
    wherein a sector-shaped notch is arranged in the fluorescent wheel, and the diffusion component is embedded in the sector-shaped notch.

5. The fluorescent wheel according to claim 1,
    wherein the fluorescent region comprises a fluorescent layer and a coating film layer arranged on the fluorescent layer; and the coating film layer is a dichroic film for transmitting the excitation laser light and reflecting the fluorescence.

6. The fluorescent wheel according to claim 5, wherein the fluorescent layer is formed by curing mixed fluorescence powder and an inorganic material, wherein the inorganic material comprises one of ceramic, quartz and glass.

7. A fluorescent wheel, comprising a fluorescent region and a transmission region;
    wherein the fluorescent region has fluorescence powder for emitting fluorescence under excitation by excitation laser light and the transmission region is for transmitting laser light;
    the fluorescent wheel is for diffusing at least the laser light which is to be transmitted by the transmission region, wherein a diffusion layer is arranged on a surface of the fluorescent wheel, and the diffusion layer is arranged corresponding to at least the transmission region, for diffusing laser light before the laser light arrives at the transmission region.

8. The fluorescent wheel according to claim 7, wherein the transmission region comprises a first laser transmission region for transmitting first laser light and a second laser transmission region for transmitting second laser light, correspondingly, the diffusion layer comprises a first laser diffusion region for diffusing the first laser light and a second laser diffusion region for diffusing the second laser light, wherein the second laser light is the excitation laser light, a degree to which light is diffused by the first laser diffusion region is larger than a degree to which light is diffused by the second laser diffusion region.

9. The fluorescent wheel according to claim 8, wherein the diffusion layer is prepared through a semiconductor photolithography process.

10. The fluorescent wheel according to claim 7, wherein the diffusion layer has a shape matching a shape of the transmission region, and is fixed on a surface of the transmission region through bonding by silicone.

11. The fluorescent wheel according to claim 7, wherein the diffusion layer is sector-shaped, a central angle to which the diffusion layer corresponds equals to a central angle to which the transmission region corresponds, and the diffusion layer is fixed to the fluorescent wheel via a rivet in a region of the central angle to which the diffusion layer corresponds to, or via dispensing in the region of the central angle to which the diffusion layer corresponds to.

12. The fluorescent wheel according to claim 7, wherein the diffusion layer is also arranged corresponding to the fluorescent region, wherein a degree to which light is diffused by the region of the diffusion layer arranged corresponding to the fluorescent region is smaller than a degree to which light is diffused by the region of the diffusion layer arranged corresponding to the transmission region.

13. The fluorescent wheel according to claim 12, wherein the diffusion layer is disc-shaped, and the diffusion layer is fixed to the fluorescent wheel via a rivet in a central region or via dispensing in the central region.

14. The fluorescent wheel according to claim 7, wherein the transmission region is made of a transparent glass material, and the diffusion layer is made of frosted glass or a diffusion sheet material.

15. The fluorescent wheel according to claim 7, wherein an antireflection film is also arranged on an outer surface of the diffusion layer.

16. A double-color laser source, comprising a blue laser device and a red laser device for respectively emitting blue laser light and red laser light, wherein the double-color laser source also comprises a fluorescent wheel wherein the fluorescent wheel comprises a fluorescent region and a transmission region;
    the fluorescent region has green fluorescence powder for emitting green fluorescence under excitation by excitation laser light and the transmission region is for transmitting first laser light and second laser light the fluorescent wheel is for diffusing at least the first laser light and the second laser light which are to be transmitted by the transmission region, wherein the first laser light is red laser light, the second laser light is blue laser light, the excitation laser light is blue laser light, and the red laser light, the blue laser light and the green fluorescence are sequentially outputted by the fluorescent wheel to form three-primary-color light.

17. The laser source according to claim 16, wherein the transmission region of the fluorescent wheel is a diffusion component, the diffusion component comprises a red laser diffusion region for transmitting and diffusing the red laser light and a blue laser diffusion region for transmitting and diffusing the blue laser light, and a degree to which light is diffused by the red laser diffusion region is larger than a degree to which light is diffused by the blue laser diffusion region.

18. The laser source according to claim 16, wherein a surface of the fluorescent wheel is also provided with a diffusion layer, which is arranged corresponding to at least the transmission region, for diffusing laser light before the laser light arrives at the transmission region;

wherein the transmission region comprises a red laser transmission region for transmitting the red laser light and a blue laser transmission region for transmitting the blue laser light, correspondingly, the diffusion layer comprises a red laser diffusion region for diffusing the red laser light and a blue laser diffusion region for diffusing the blue laser light, and a degree to which light is diffused by the red laser diffusion region is larger than a degree to which light is diffused by the blue laser diffusion region.

19. The laser source according to claim 16, wherein, a first focusing optical path system is configured such that the red laser light and the blue laser light also pass through the first focusing optical path system before being incident onto the fluorescent wheel, for focusing and reducing light spots of the red laser light and the blue laser light to a predetermined size.

20. The laser source according to claim 19, wherein the first focusing optical path system comprises a first focusing lens group and a second focusing lens;

wherein the first focusing lens group comprises two first convex lenses respectively arranged on emergent optical paths of the blue laser light and the red laser light; the second focusing lens is one second convex lens arranged near a laser light incident side of the fluorescent wheel, for secondarily focusing and allowing a beam of the blue laser light and a beam of the red laser light to be incident onto the fluorescent wheel.

21. The laser source according to claim 20, wherein a diffusion sheet is fixedly arranged between the fluorescent wheel and the second focusing lens.

22. A laser projection equipment, comprising a display component, an optical module, a control component and the double-color laser source of claim 16, wherein the optical module comprises a first optical component for guiding light from the double-color laser source towards the display component, and a second optical component for projecting light emitted by the display component to a screen, and the control component is configured to control the display component and the double-color laser source.

* * * * *